(12) United States Patent
Sasaki et al.

(10) Patent No.: US 11,258,948 B2
(45) Date of Patent: Feb. 22, 2022

(54) IMAGE PICKUP APPARATUS, CONTROL METHOD OF IMAGE PICKUP APPARATUS, AND STORAGE MEDIUM

(71) Applicant: CANON KABUSHIKI KAISHA, Tokyo (JP)

(72) Inventors: Takashi Sasaki, Yokohama (JP); Satoru Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 16/850,698

(22) Filed: Apr. 16, 2020

(65) Prior Publication Data
US 2020/0244886 A1    Jul. 30, 2020

Related U.S. Application Data

(63) Continuation of application No. PCT/JP2018/039129, filed on Oct. 22, 2018.

(30) Foreign Application Priority Data

Oct. 27, 2017  (JP) .............................. JP2017-208367
Oct. 27, 2017  (JP) .............................. JP2017-208368
Oct. 5, 2018   (JP) .............................. JP2018-189987

(51) Int. Cl.
| H04N 5/232 | (2006.01) |
| H04N 5/351 | (2011.01) |
| G03B 7/093 | (2021.01) |
| H04N 5/235 | (2006.01) |
| H04N 5/225 | (2006.01) |

(52) U.S. Cl.
CPC ......... *H04N 5/23254* (2013.01); *G03B 7/093* (2013.01); *H04N 5/2258* (2013.01); *H04N 5/235* (2013.01); *H04N 5/351* (2013.01)

(58) Field of Classification Search
None
See application file for complete search history.

(56) References Cited

U.S. PATENT DOCUMENTS

2018/0278822 A1* 9/2018 Takahashi .............. H04N 5/243

FOREIGN PATENT DOCUMENTS

| JP | 2002-40506 A | 2/2002 |
| JP | 2006-197192 A | 7/2006 |
| JP | 2009-77272 A | 4/2009 |
| WO | 2017/090458 A1 | 6/2017 |

* cited by examiner

*Primary Examiner* — Quan Pham
(74) *Attorney, Agent, or Firm* — Canon U.S.A., Inc. IP Division

(57) ABSTRACT

The image pickup apparatus of the present invention sets at least an imaging magnification of an optical system included in a second image pickup device or a sampling pitch of a signal in the second image pickup device; calculates, using image data of a plurality of frames captured by second image pickup device during exposure of first image pickup device for image data of a first frame, the amount of subject motion in the image data of the plurality of frames; and controls the exposure of the first image pickup device for the image data of the first frame, on the basis of the calculated amount of subject motion.

20 Claims, 22 Drawing Sheets

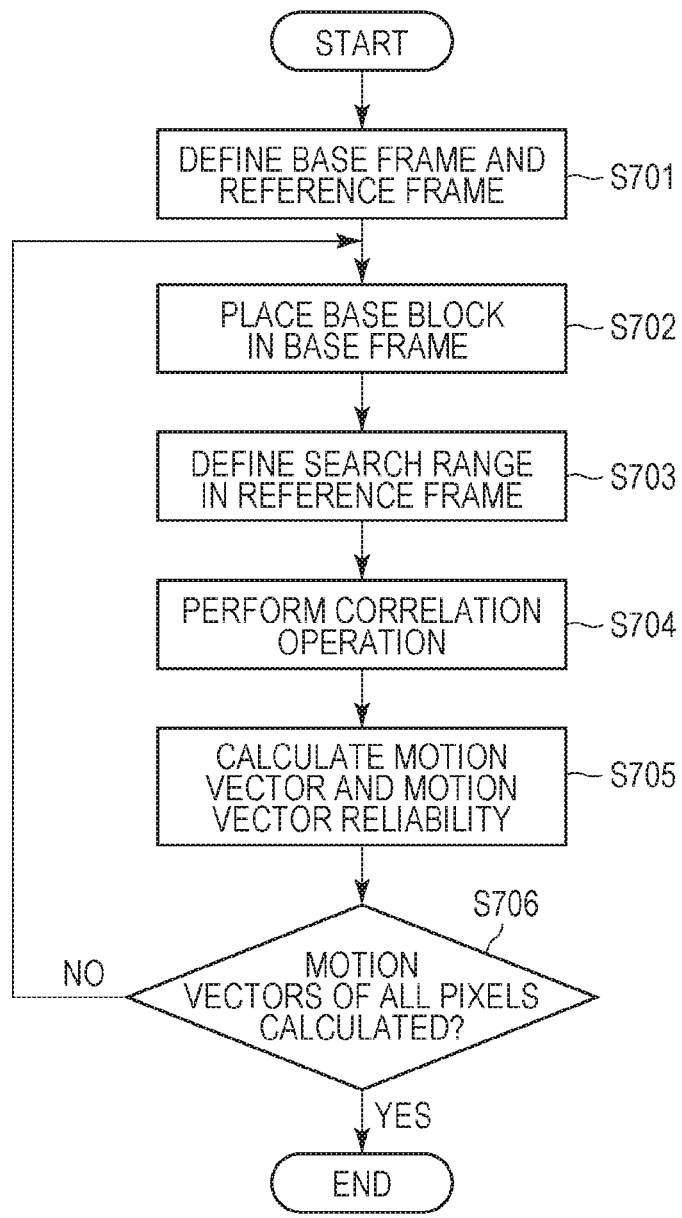

FIG. 12A

|  | FIRST IMAGE PICKUP ELEMENT 115 | SECOND IMAGE PICKUP ELEMENT 125 |
| --- | --- | --- |
| HORIZONTAL SIZE OF IMAGE PICKUP PORTION (mm) | 36 | 4 |
| NUMBER OF PIXELS IN HORIZONTAL DIRECTION (pix) | 6400 | 640 |
| PIXEL PITCH (μm) | 5.62 | 6.25 |
| FRAME RATE (fps) | 20 | 1000 |

FIG. 12B

|  | FIRST IMAGE PICKUP ELEMENT 115 | SECOND IMAGE PICKUP ELEMENT 125 |
| --- | --- | --- |
| HORIZONTAL SIZE OF IMAGE PICKUP PORTION (mm) | 36 | 36 |
| NUMBER OF PIXELS IN HORIZONTAL DIRECTION (pix) | 6400 | 6400 |
| NUMBER OF READ PIXELS IN HORIZONTAL DIRECTION (pix) | 6400 | 640 |
| PIXEL PITCH (μm) | 5.62 | 5.62 |
| FRAME RATE (fps) | 20 | 1000 |

FIG. 12C

|  | FIRST IMAGE PICKUP ELEMENT 115 | SECOND IMAGE PICKUP ELEMENT 125 |
| --- | --- | --- |
| HORIZONTAL SIZE OF IMAGE PICKUP PORTION (mm) | 36 | 3.6 |
| NUMBER OF PIXELS IN HORIZONTAL DIRECTION (pix) | 7200 | 720 |
| PIXEL PITCH (μm) | 5 | 5 |
| FRAME RATE (fps) | 20 | 1000 |

IMAGE PICKUP APPARATUS, CONTROL METHOD OF IMAGE PICKUP APPARATUS, AND STORAGE MEDIUM

CROSS-REFERENCE TO RELATED APPLICATIONS

This application is a Continuation of International Patent Application No. PCT/JP2018/039129, filed Oct. 22, 2018, which claims the benefit of Japanese Patent Application Nos. 2017-208367, filed Oct. 27, 2017, 2017-208368, filed Oct. 27, 2017, and 2018-189987, filed Oct. 5, 2018, all of which are hereby incorporated by reference herein in their entirety.

TECHNICAL FIELD

The present invention relates to a technique for capturing an image with less blur.

BACKGROUND ART

In recent years, image pickup apparatuses having a photographing mode that gives a higher priority to shutter speed have been known. Examples of such image pickup apparatuses include camera-equipped smartphones and digital cameras. The photographing mode described above allows the photographer to set a desired shutter speed while allowing the image pickup apparatus to automatically set other exposure settings, such as an aperture and ISO speed. With this photographing mode, the photographer can capture an image at a desired shutter speed. For example, by setting a shutter speed that provides short exposure time, the image of a fast-moving subject, such as waterfall spray or racing cars, can be captured with less motion blur. Japanese Patent Laid-Open No. 2006-197192 discloses an image pickup apparatus that detects the amount of subject motion in an image captured before capturing the still image, and determines the shutter speed on the basis of the result of the detection.

To capture an image with less motion blur, the image needs to be captured at a high shutter speed which provides short exposure time. However, even when the shutter speed is set high before image capturing, the captured image may still have motion blur.

For example, the photographer or the image pickup apparatus predicts how fast a moving body will move before image capturing, and the image of the moving body is captured at a shutter speed set such that motion blur can be reduced. However, if the subject moves unexpectedly fast during capturing of the image to be recorded, the captured image of the subject may be blurred even when captured at the shutter speed set beforehand.

SUMMARY OF INVENTION

An aspect of the present invention is an image pickup apparatus that includes first image pickup device; second image pickup device; and at least one processor or circuit configured to perform the operations of following units: calculating unit configured to calculate, using image data of a plurality of frames captured by the second image pickup device during exposure of the first image pickup device for image data of a first frame, the amount of subject motion in the image data of the plurality of frames; control unit configured to control the exposure of the first image pickup device for the image data of the first frame, on the basis of the amount of subject motion calculated by the calculating unit; and setting unit configured to set at least an imaging magnification of an optical system included in the second image pickup device or a sampling pitch of a signal in the second image pickup device, in accordance with a resolution of image data generated by the first image pickup device, a resolution of image data generated by the second image pickup device, and a permissible blur value in the first image pickup device.

Another aspect of the present invention is an image pickup apparatus that is removable from an external image pickup apparatus including first image pickup device. The image pickup apparatus includes second image pickup device; and at least one processor or circuit configured to perform the operations of following units: calculating unit configured to calculate, using image data of a plurality of frames captured by the second image pickup device during exposure of the first image pickup device for image data of a first frame, the amount of subject motion in the image data of the plurality of frames; and control unit configured to output a signal for controlling the exposure of the first image pickup device for the image data of the first frame, on the basis of the amount of subject motion calculated by the calculating unit; and setting unit configured to set at least an imaging magnification of an optical system included in the second image pickup device or a sampling pitch of a signal in the second image pickup device, in accordance with a resolution of image data generated by the first image pickup device, a resolution of image data generated by the second image pickup device, and a permissible blur value in the first image pickup device.

Further features of the present invention will become apparent from the following description of exemplary embodiments with reference to the attached drawings.

BRIEF DESCRIPTION OF DRAWINGS

FIG. 7 is a flowchart illustrating how a motion vector and a motion vector reliability are calculated by a motion vector calculating circuit according to the first embodiment of the present invention.

FIG. 12A is a table that compares the configurations of the first and second image pickup elements according to the first embodiment of the present invention.

FIG. 12B is a table that compares the configurations of first and second image pickup elements according to a second embodiment of the present invention.

FIG. 12C is a table that compares the configurations of first and second image pickup elements according to a fourth embodiment of the present invention.

DESCRIPTION OF EMBODIMENTS

Embodiments of the present invention will now be described in detail using the attached drawings. Although a so-called digital camera will be described as an image pickup apparatus according to any of the embodiments of the present invention, the present invention is not limited to this. The image pickup apparatus may be implemented as other devices having an image pickup function, such as digital video cameras, mobile phones, smartphones, and other mobile electronic devices.

First Embodiment

A first embodiment of the present invention describes an image pickup apparatus by which an image with less blur is captured by determining the exposure end timing, on the basis of the result of motion analysis that is made using motion vectors during the period of exposure. The first embodiment of the present invention will now be described.

Figure 1A:
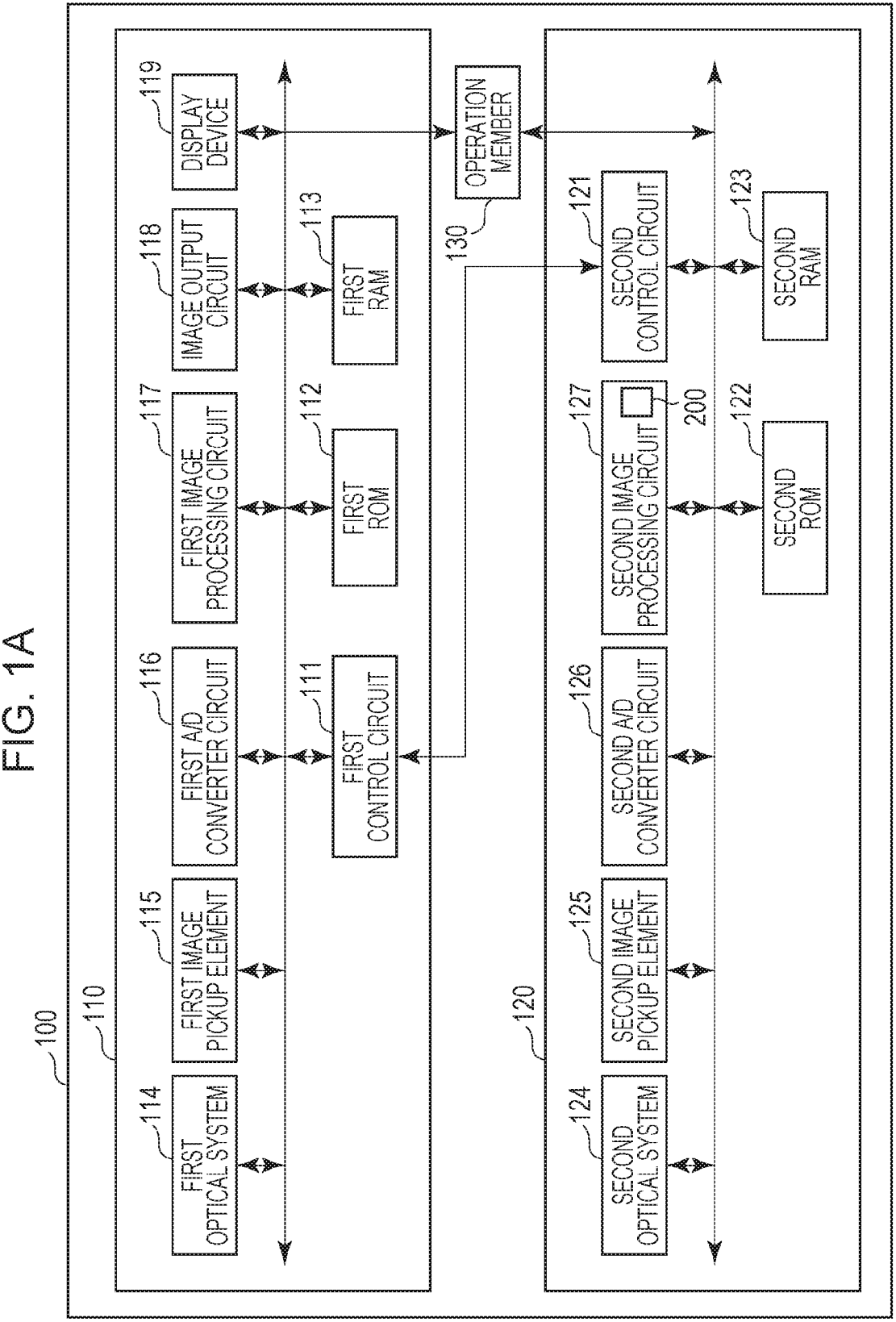
FIG. 1A is a block diagram illustrating an exemplary configuration of an image pickup apparatus according to a first embodiment of the present invention.

FIG. 1A is a block diagram illustrating an exemplary configuration of an image pickup apparatus 100 according to the first embodiment of the present invention. The image pickup apparatus 100 includes a first image pickup system 110, a second image pickup system 120, and an operation member 130.

First, the first image pickup system 110 will be described. A first control circuit 111 is a processor, such as a central processing unit (CPU) or a micro-processing unit (MPU). The first control circuit 111 reads, from a first read-only memory (ROM) 112 (described below), an operation program for each block of the first image pickup system 110, develops the read operation program in a first random-access memory (RAM) 113 (described below), executes the developed operation program, and thereby controls the operation of the block of the first image pickup system 110. The first control circuit 111 has control over the overall operation of the first image pickup system 110 and the second image pickup system 120. The first ROM 112 is an electrically erasable and recordable non-volatile memory. The first ROM 112 stores the operation program for each block of the first image pickup system 110, and also stores parameters required for the operation of the block. The first RAM 113 is a rewritable volatile memory, and is used as a temporary storage area for temporarily storing data that is output in the operation of each block of the first image pickup system 110.

A first optical system 114 is formed by a lens group including a zoom lens and a focus lens. The first optical system 114 forms a subject image onto a first image pickup element 115 (described below). The first image pickup element 115 is formed, for example, by a charge-coupled device (CCD) or complementary metal oxide semiconductor (CMOS) sensor including a color filter of multiple colors. The first image pickup element 115 photoelectrically converts an optical image formed on the first image pickup element 115 by the first optical system 114, and outputs the resulting analog image signal to a first analog-to-digital (A/D) converter circuit 116. The first image pickup element 115 starts exposure when a shutter button included in the operation member 130 is pressed all the way down, and ends the exposure in accordance with an exposure end timing signal output from an exposure-end timing generator circuit 200 (described below). The first A/D converter circuit 116 converts the received analog image signal to a digital image signal, and outputs the resulting digital image data to the first RAM 113.

The first image processing circuit 117 applies various types of image processing to the image data stored in the first RAM 113. Examples of the image processing include white balance control, color interpolation, noise correction, gamma processing, conversion to luminance and color difference signals, and aberration correction. An image output circuit 118 is a circuit configured to receive the image data processed by the first image processing circuit 117 through the first RAM 113, and output the received image data to an external device. Specifically, for example, the image output circuit 118 reads and writes the image data from and to a recording medium removable from the image pickup apparatus 100, and transmits and receives an image to and from a smartphone or server using a wireless or wired communication function. A display device 119 is, for example, a liquid crystal display (LCD) or an organic electroluminescent (EL) display, and displays an image recorded in the first RAM 113.

The second image pickup system 120 will now be described. A second control circuit 121 is a processor, such as a CPU or an MPU. The second control circuit 121 reads, from a second ROM 122 (described below), an operation program for each block of the second image pickup system 120, develops the read operation program in a second RAM 123 (described below), executes the developed operation program, and thereby controls the operation of the block of the second image pickup system 120. The second ROM 122 is an electrically erasable and recordable non-volatile memory. The second ROM 122 stores the operation program for each block of the second image pickup system 120, and also stores parameters required for the operation of the block. The second RAM 123 is a rewritable volatile memory, and is used as a temporary storage area for temporarily storing data that is output in the operation of each block of the second image pickup system 120.

A second optical system 124 is formed by a lens group including a zoom lens and a focus lens. The second optical system 124 forms a subject image onto a second image pickup element 125 (described below). The second image pickup element 125 is an image pickup element, such as a CCD or CMOS sensor. The second image pickup element 125 photoelectrically converts an optical image formed on the second image pickup element 125 by the second optical system 124, and outputs the resulting analog image signal to a second A/D converter circuit 126. The second image pickup element 125, which is an element used to detect motions and blur, is not necessarily required to include a color filter of multiple colors, and may include a monochromatic (white) filter or an infrared filter. The second A/D converter circuit 126 converts the received analog image signal to a digital image signal, and outputs the resulting digital image data to the second RAM 123.

The second image processing circuit 127 applies various types of image processing to the image data stored in the second RAM 123. Examples of the image processing include simple noise correction and gamma processing. If the second image pickup element 125 includes a color filter of multiple colors, the second image processing circuit 127 also performs color interpolation or conversion to luminance signals. The second image processing circuit 127 includes the timing generator circuit 200. On the basis of the result of motion analysis made using image data stored in the second RAM 123, the second image processing circuit 127 generates an exposure end timing signal indicating when to terminate the exposure of the first image pickup element 115. The exposure end timing signal is output through the second control circuit 121 to the first image pickup system 110. When the first image pickup system 110 receives this signal, the first control circuit 111 carries out control to end the exposure of the first image pickup element 115.

The operation member 130 is an operation member that receives instructions from the user, and includes the shutter button and dial keys. The display device 119 may have a touch panel function. A signal generated by the user's operation on the operation member 130 is reflected in drive control of the first image pickup system 110 and the second image pickup system 120.

Figure 1B:
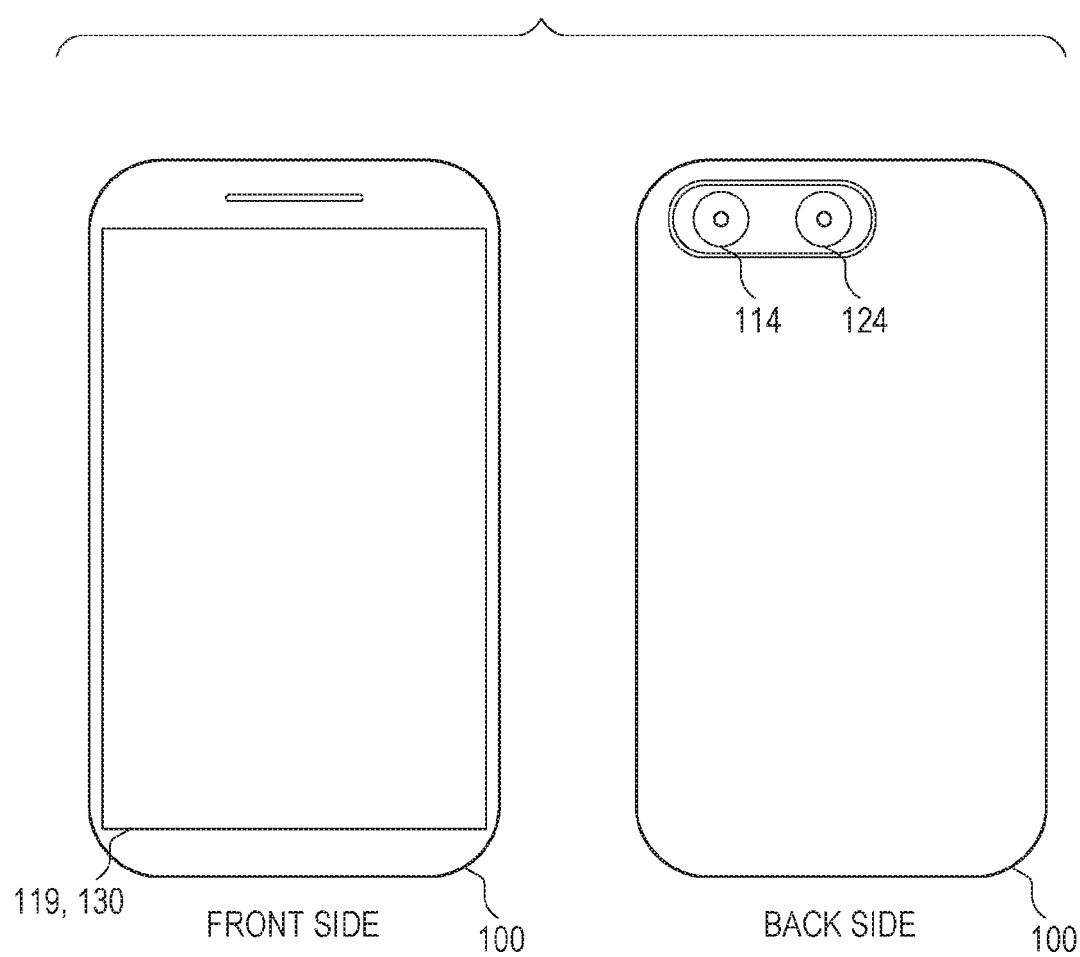
FIG. 1B illustrates a smartphone as an example of the image pickup apparatus according to the first embodiment of the present invention.

Although the first image pickup system 110 and the second image pickup system 120 are integrally configured to form the image pickup apparatus 100 in this example, the configuration is not limited to this. For example, the first image pickup system 110 and the operation member 130 may form a camera body, and the second image pickup system 120 may be an image pickup apparatus removable from the camera body. That is, the second image pickup system 120 may be an image pickup apparatus removable from an external image pickup apparatus. If the first image pickup system 110 is a single-lens reflex camera, an interchangeable lens device including the first optical system 114 is configured to be removable from the camera body including the first image pickup element 115, the display device 119, and the operation member 130. FIG. 1B illustrates a smartphone (or tablet terminal) as an example of the image pickup apparatus 100. The smartphone has, on the front side thereof, a touch panel serving both as the display device 119 and the operation member 130. The smartphone has, on the back side thereof, the first optical system 114 of the first image pickup system 110 and the second optical system 124 of the second image pickup system 120. The present invention can also be implemented in such a smartphone.

If the first control circuit 111 is configured to also serve as the second control circuit 121, the second control circuit 121 may be removed. The second image pickup system 120 may include only the second optical system 124, the second image pickup element 125, the second A/D converter circuit 126, and the second RAM 123, and functions of the other components of the second image pickup system 120 may be performed by the first image pickup system 110. In this case, if the second image pickup system 120 is configured as a separate camera device, the configuration of the second image pickup system 120 can be simplified.

The first image pickup element 115 is designed to generate an image to be recorded, whereas the second image pickup element 125 is designed to detect the motion of a fast-moving subject, and accordingly, the first image pickup element 115 and the second image pickup element 125 require different frame rates. FIG. 12A is a table that compares the configurations of the first image pickup element 115 and the second image pickup element 125 according to the present embodiment. In the present embodiment, the first image pickup element 115 has a frame rate of 20 frames per second (fps), whereas the second image pickup element 125 has a frame rate of 1000 fps.

Therefore, for the second image pickup element 125, a shutter speed that provides shorter exposure time than that of the first image pickup element 115 can be set. To achieve this shutter speed, the second image pickup element 125 needs to have higher sensitivity than the first image pickup element 115. Accordingly, the second image pickup element 125 is configured to have a larger pixel pitch than the first image pickup element 115, instead of being reduced in the number of pixels. Specifically, as in FIG. 12A, the first image pickup element 115 and the second image pickup element 125 are 36 mm and 4 mm, respectively, in the horizontal size of the image pickup portion. The first image pickup element 115 and the second image pickup element 125 have 6400 pixels and 640 pixels, respectively, in the horizontal direction. The first image pickup element 115 and the second image pickup element 125 have pixel pitches of 5.62 μm and 6.25 μm, respectively.

The configuration of the timing generator circuit 200 included in the second image processing circuit 127 of the second image pickup system 120 will now be described using FIG. 2. The timing generator circuit 200 performs motion analysis by detecting motion vectors of image data captured at a high frame rate by the second image pickup element 125 and stored in the second RAM 123. If the second image pickup element 125 includes a color filter of multiple colors, the image data is already subjected to interpolation or conversion to luminance signals, so that pixels of the image data have signals of the same component. On the basis of the result of this motion analysis, the timing generator circuit 200 determines when to end the exposure of the first image pickup element 115, and outputs a signal for terminating the exposure of the first image pickup element 115 to the first image pickup system 110.

Figure 2:
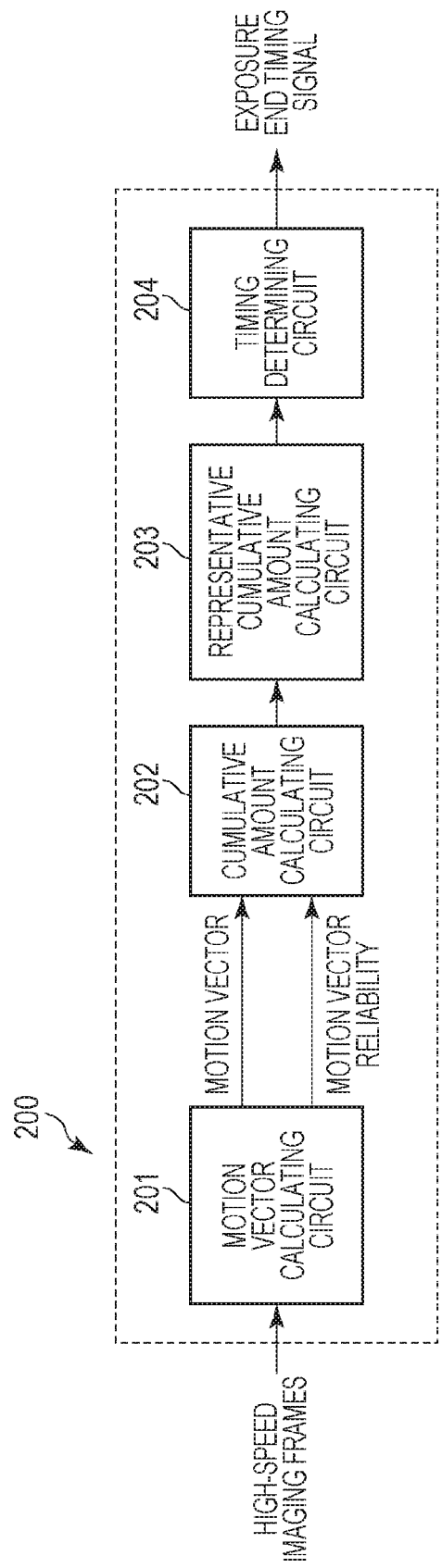
FIG. 2 is a block diagram illustrating an exemplary configuration of a timing generator circuit according to the first embodiment of the present invention.

FIG. 2 is a block diagram illustrating an exemplary configuration of the timing generator circuit 200 according to the first embodiment. Referring to FIG. 2, the timing generator circuit 200 includes a motion vector calculating circuit 201, a cumulative amount calculating circuit 202, a representative cumulative amount calculating circuit 203, and a timing determining circuit 204.

Figure 3:
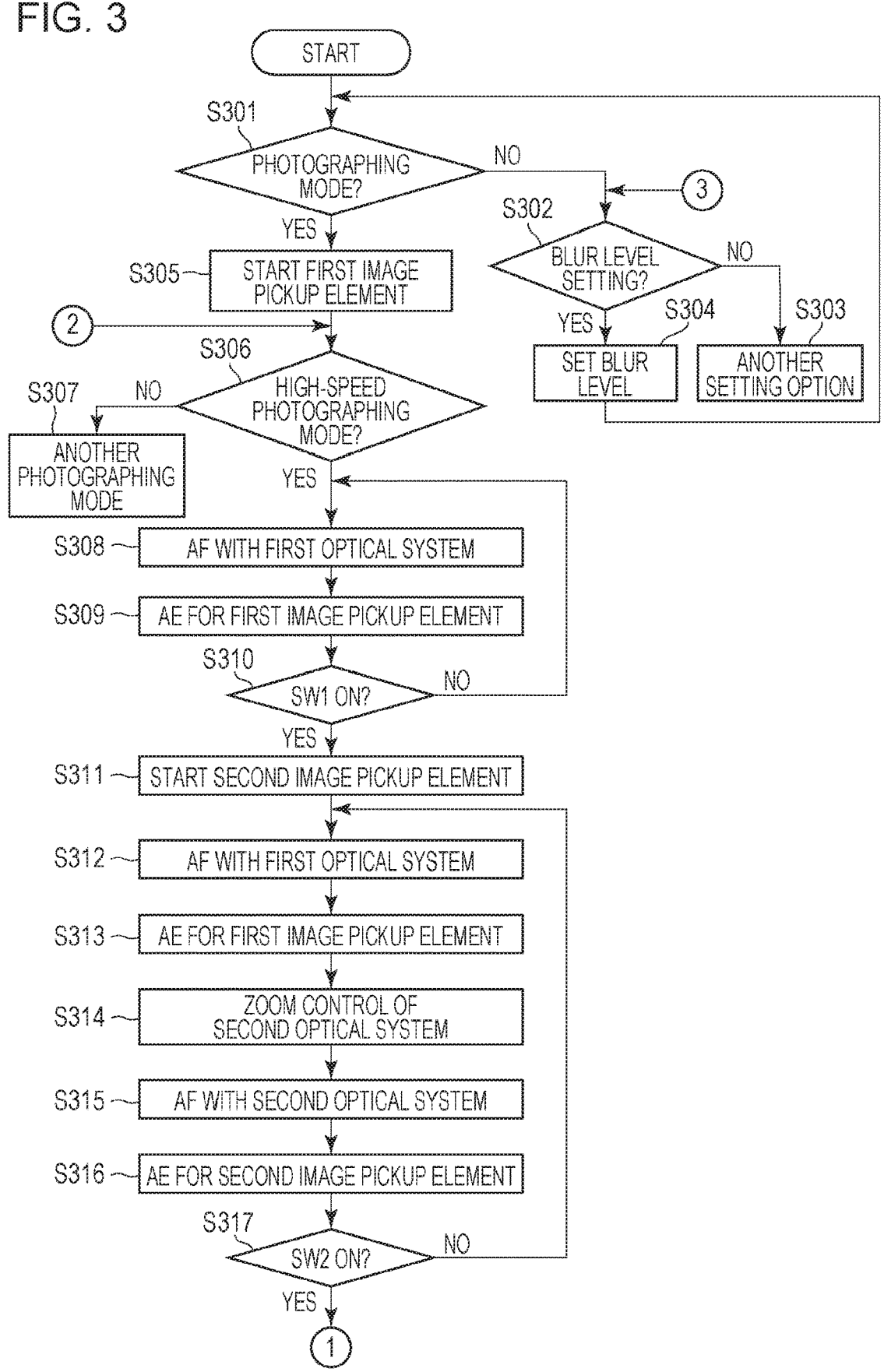
FIG. 3 is a flowchart illustrating image pickup processing in high-speed photographing mode according to the first embodiment of the present invention.
Figure 4:
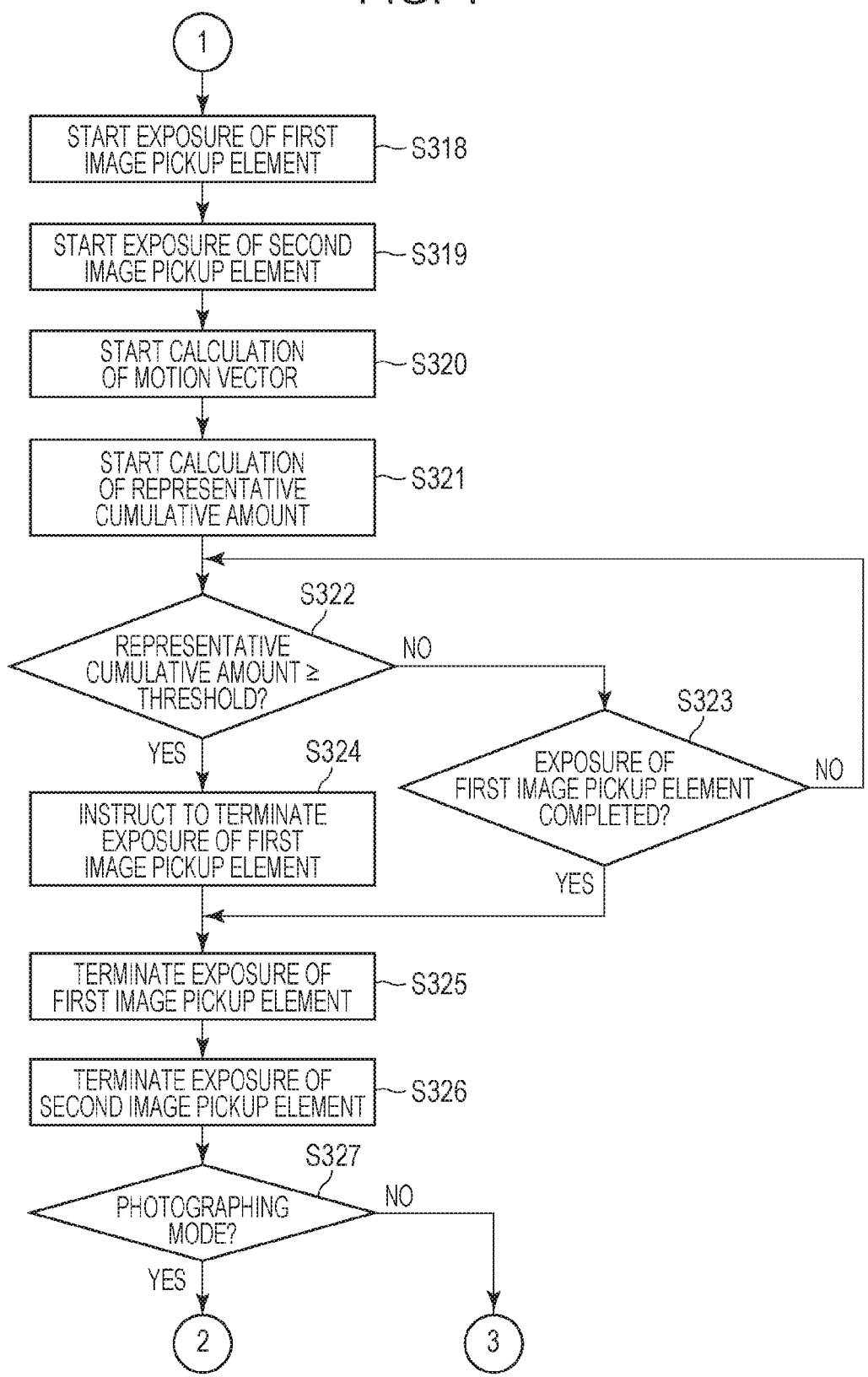
FIG. 4 is another flowchart illustrating the image pickup processing in high-speed photographing mode according to the first embodiment of the present invention.

With reference to the flowcharts of FIGS. 3 and 4, image pickup processing in a high-speed photographing mode of the image pickup apparatus 100 according to the first embodiment of the present invention will now be described. FIGS. 3 and 4 are flowcharts illustrating image pickup processing in the high-speed photographing mode according to the first embodiment. The flow of FIG. 3 starts when the image pickup apparatus 100 is powered on.

In step S301, the first control circuit 111 determines whether any photographing mode is set. If it is not set, the process proceeds to step S302, whereas if it is set, the process proceeds to step S305.

In step S302, the first control circuit 111 determines whether blur level setting is selected as a setting option. If another setting option is selected, the process proceeds to step S303, where the selected setting is performed. If the first control circuit 111 determines that blur level setting is selected, the process proceeds to step S304.

In step S304, the first control circuit 111 displays on the display device 119 a screen for setting a blur level, and sets a blur level in accordance with the user's operation on the operation member 130. For example, the display device 119 displays blur levels stepwise, from "normal" to "low", from which the user can select. A threshold (described below) is set such that the closer the blur level selected by the user is to "low", the less the blur contained in the captured image. The present embodiment will be described on the assumption that the user has selected the blur level "low" at which blur is minimized.

Upon selection of a blur level, the first control circuit 111 determines a permissible blur value for the first image pickup system 110. On the basis of this permissible blur value, the second control circuit 121 sets a threshold used in step S322 (described below). For the blur level "low", the permissible blur value is set to the diameter of permissible circle of confusion. The diameter of permissible circle of confusion is a limit value up to which an observer with an eyesight of 1.0 can resolve when observing a photograph at a distance of distinct vision of 250 mm. The diameter of permissible circle of confusion is about 20 µm on an image pickup element with dimensions of 36 mm×24 mm. In the first embodiment of the present invention, the sum of four pixel pitches of the first image pickup element 115, 22.48 µm (5.62×4), is defined as the diameter of permissible circle of confusion. Upon setting both the blur level and the threshold, the process returns to step S301.

In step S305, the first control circuit 111 starts the first image pickup element 115.

In step S306, the first control circuit 111 determines whether a high-speed photographing mode is selected as a photographing mode. If the high-speed photographing mode is not selected, the process proceeds to step S307, where the first control circuit 111 performs processing for another photographing mode. If the first control circuit 111 determines that the high-speed photographing mode is selected, the process proceeds to step S308.

In step S308, on the basis of the contrast level of the subject obtained from the first image pickup element 115 or the output of a focus detecting sensor (not shown), the first control circuit 111 drives the first optical system 114 to perform autofocus (AF) control.

In step S309, on the basis of the luminance value of the subject obtained from the first image pickup element 115, the first control circuit 111 performs automatic exposure (AE) control for the first image pickup element 115.

In step S310, the first control circuit 111 determines whether SW1 in the shutter switch included in the operation member 130 has been turned on by pressing the shutter switch halfway down. Steps S308 and S309 are repeated until SW1 is determined to be "on".

If the first control circuit 111 determines in step S310 that SW1 is on, the second control circuit 121 starts the second image pickup element 125 in step S311.

In step S312, the first control circuit 111 performs AF control using the first optical system 114 on a main subject selected when SW1 has been turned on.

In step S313, the first control circuit 111 performs AE control for the first image pickup element 115 on the main subject selected when SW1 has been turned on.

In step S314, the second control circuit 121 receives zoom information of the first optical system 114 from the first control circuit 111 and controls the zoom state of the second optical system 124. The description of how the zoom state of the second optical system 124 is controlled will now be given with reference to FIG. 5.

Figure 5:
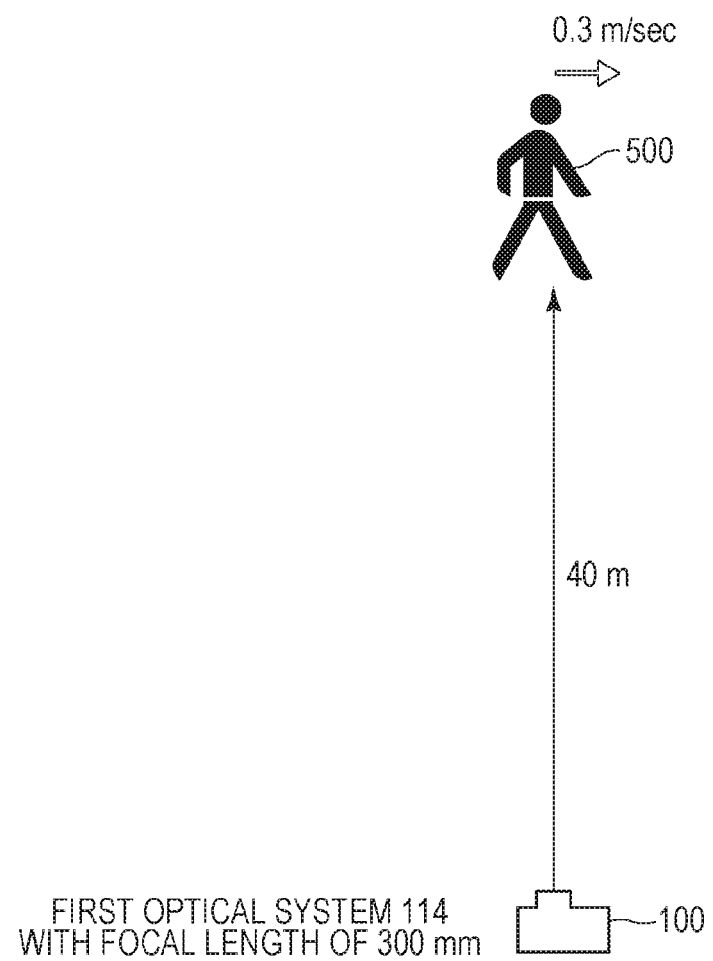
FIG. 5 is a diagram for explaining a positional relation between an image pickup apparatus and a subject.

FIG. 5 is a diagram for explaining how the image pickup apparatus 100 and a subject 500 positionally relate to each other when SW1 is turned on. Referring to FIG. 5, the first optical system 114 of the image pickup apparatus 100 has a focal length of 300 mm, and is trying to capture the image of the subject 500 moving 40 m ahead at a speed of 0.3 m/second (300 mm/second). Assume that the subject 500 is moving near the optical axis of the first optical system 114. In the following description, the position 40 m ahead is referred to as an object plane. The moving speed of the subject 500 can be measured by calculating motion vectors (described below) from information about the distance to the subject 500 and images obtained during framing.

The imaging magnification of the first optical system 114 according to the present embodiment can be obtained by dividing the distance to the subject 500 by the focal length, 40×1000÷300=133.3.

The angle of view of the subject in the object plane, captured by the entire first image pickup element 115, is 133.3×5.62×6400/1000=4795.7 mm.

Assume that before SW1 is turned on, images obtained by the first image pickup system 110 and the second image pickup system 120 have the same angle of view. In this case, the second optical system 124 has an imaging magnification of 4795.7×1000÷6.25÷640=1198.9 and a focal length of 40×1000÷1198.9=33.3 mm. In this case, the subject size in the object plane is 1198.9×6.25÷1000=7.5 mm per pixel of the second image pickup element 125. Multiplying this value by the resolution of motion vector calculation (described below) gives the resolution of motion that can be captured by the second image pickup element 125. When the motion vector calculation has a resolution of 0.5 pixels, the motion resolution is 7.5×0.5=3.75 mm.

The subject size in the object plane is 133.3× 5.62÷1000=0.75 mm per pixel of the first image pickup element 115, and the permissible blur value, which corresponds to four pixels, is 0.75×4=3.0 mm. Since the permissible blur value is smaller than the motion resolution of the second image pickup element 125, even when the second image pickup element 125 is used here, it cannot be determined whether blur in the first image pickup element 115 does not exceed the permissible value.

Accordingly, the second control circuit 121 shifts the focal length of the second optical system 124 to the telephoto end to perform zooming, so as to increase the resolution of motion detection in the second image pickup element 125.

The subject 500 moving at a speed of 300 mm/second takes 3.0÷300×1000=10.0 milliseconds to reach the permissible blur value 3.0 mm.

The second image pickup system 120 is thus required to have a motion resolution of 3.0÷10.0÷0.5=0.6 mm per frame (1 millisecond).

Therefore, when the second control circuit 121 changes the imaging magnification of the second optical system 124 to 0.6×1000÷6.25=96.0, and shifts the focal length of the second optical system 124 to 40×1000÷96.0=416.6 mm, the motion resolution becomes finer than the permissible blur value. Thus, on the basis of the result of motion detection using image data obtained by the second image pickup element 125, the timing of when to end the exposure of the first image pickup element 115 can be controlled, and the image of the subject 500 can be captured with blur not exceeding the diameter of permissible circle of confusion.

Since the second optical system 124 is zoomed toward the telephoto end, the angle of view of the second image pickup element 125 differs from that of the first image pickup element 115. Specifically, the angle of view of the second image pickup element 125 is 96.0×6.25×640/1000=384.0 mm. Thus, as the focal length increases and the zoom position shifts toward the telephoto end, the angle of view is narrowed. Therefore, any subject existing outside the vicinity of the optical axis may be off the field of view. It is preferable to be able to move the field of view to a region off the optical axis, by using a known technique that can move the position of the optical axis or the image pickup element.

Referring back to FIG. 3, in step S315, on the basis of information about the main subject selected when SW1 has been turned on, the second control circuit 121 performs AF control using the second optical system 124.

In step S316, on the basis of the information about the main subject selected when SW1 has been turned on, the second control circuit 121 performs AE control for the first image pickup element 115.

In step S317, the first control circuit 111 determines whether SW2 in the shutter switch included in the operation member 130 has been turned on by pressing the shutter switch all the way down. Steps S312 to S316 are repeated until SW2 is determined to be "on".

If the first control circuit 111 determines in step S317 that SW2 is on, the process proceeds to step S318 of FIG. 4, where the first control circuit 111 sets an exposure period on the basis of the result of AE control performed in step S313 and starts the exposure of the first image pickup element 115.

In step S319, the second control circuit 121 sets the frame rate to 1000 fps, or to a value that is a predetermined number of times (e.g., 50 times) the frame rate set for the first image pickup element 115, and starts exposure of the second image pickup element 125. When the exposure time corresponding to the set frame rate elapses, the second image pickup element 125 outputs the resulting analog image signal to the second A/D converter circuit 126, and immediately starts the next exposure. That is, during one exposure period of the first image pickup element 115, the exposure of the second image pickup element 125 is repeated at a faster frame rate.

Figure 6:
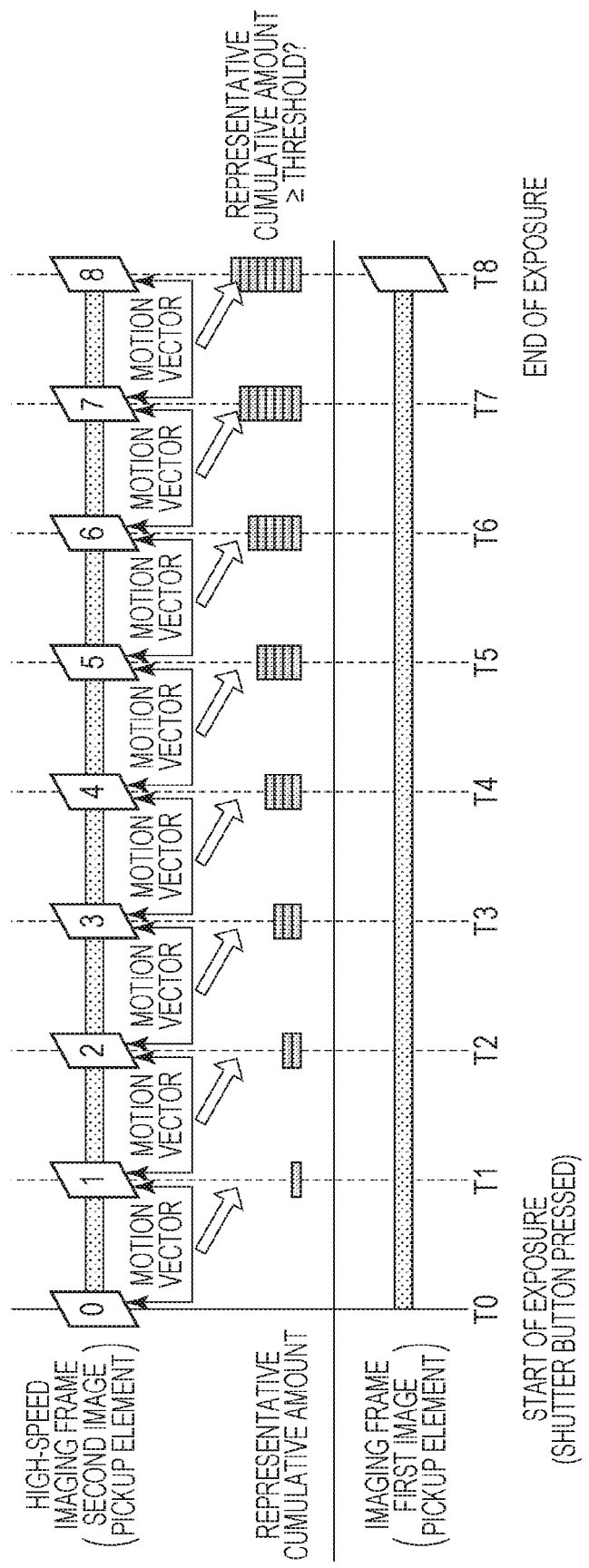
FIG. 6 is a diagram for explaining an operation performed by a first image pickup element, a second image pickup element, and the timing generator circuit according to the first embodiment of the present invention.

FIG. 6 is a diagram for explaining an operation performed by the first image pickup element 115, the second image pickup element 125, and the timing generator circuit 200. At time T0 in FIG. 6, the user presses the shutter button all the way down to turn on SW2. In response to this, the first image pickup element 115 of the first image pickup system 110 immediately starts exposure. Also, the second image pickup element 125 of the second image pickup system 120 starts image capturing at a high frame rate. After SW2 is turned on at time T0, the second image pickup element 125 continuously performs image capturing at short intervals of exposure at time T1, time T2, time T3, and so on.

In step S320, the motion vector calculating circuit 201 in the timing generator circuit 200 calculates a motion vector between frames of image data obtained by the second image pickup element 125, and also calculates the reliability of the motion vector. Motion vector refers to a vector that represents the amount of horizontal and vertical movement of the subject between frames. A motion vector calculating method will now be described in detail using FIGS. 7 to 9.

Figure 8A:
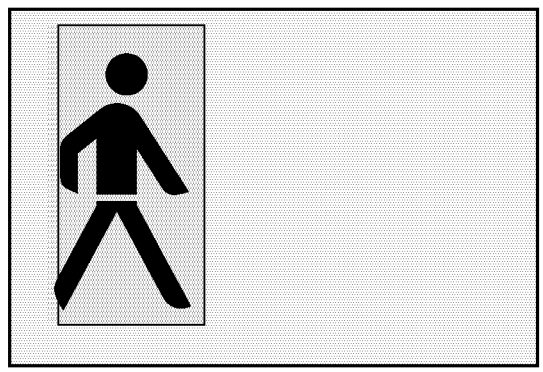
FIG. 8A illustrates image data of the M-th frame.
Figure 8B:
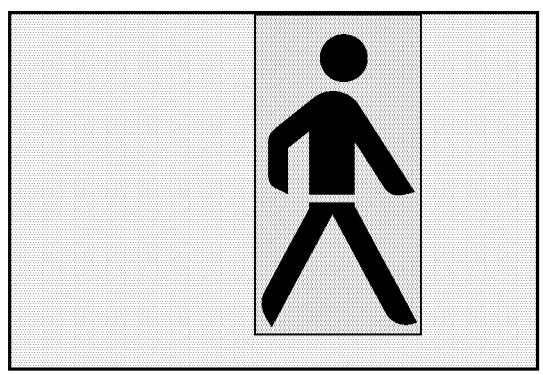
FIG. 8B illustrates image data of the (M+1)-th frame.
Figure 8C:
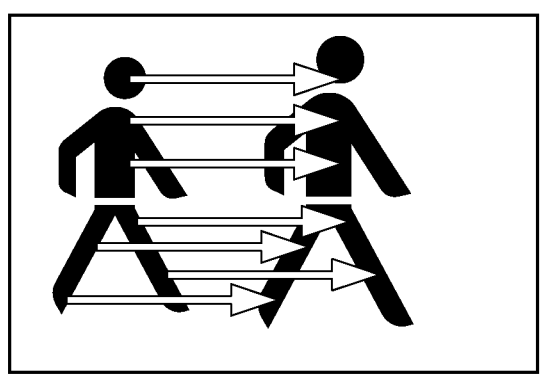
FIG. 8C illustrates motion vectors between the M-th frame and the (M+1)-th frame.
Figure 9:
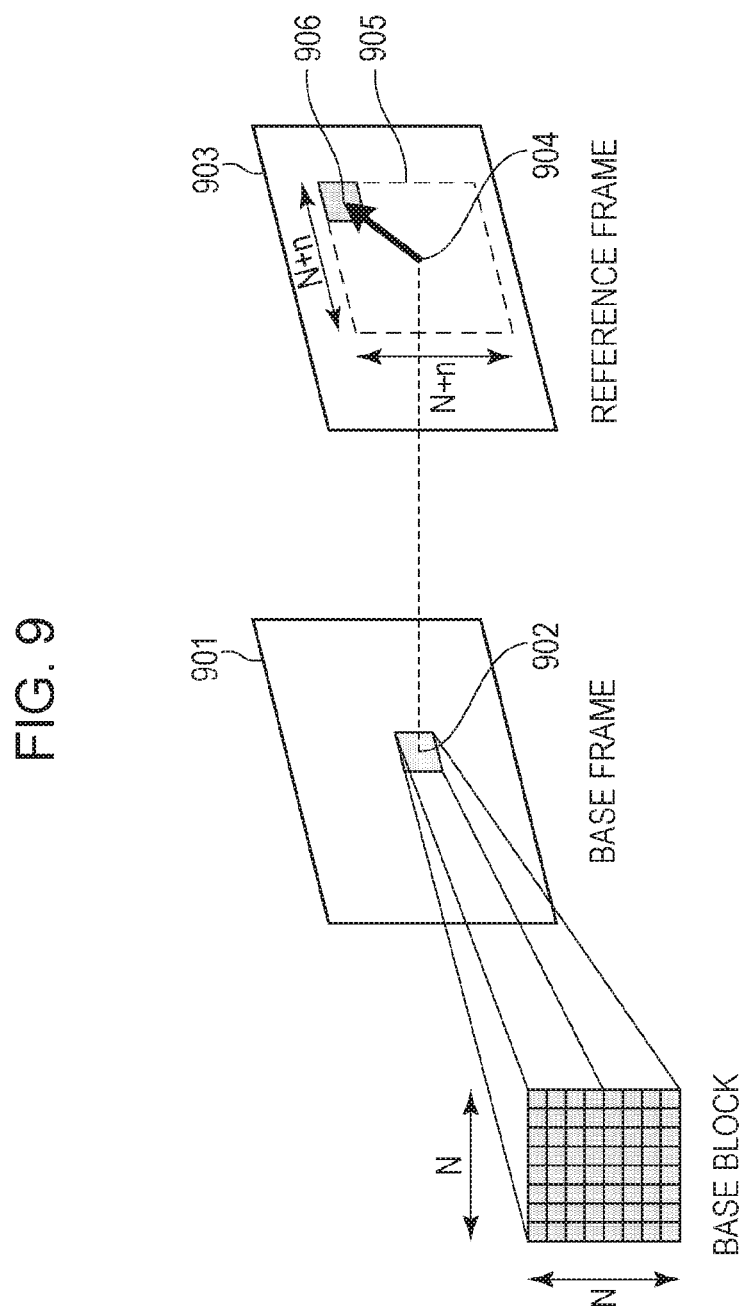
FIG. 9 is a diagram for explaining a motion vector calculating method using block matching.

FIG. 7 is a flowchart illustrating how the motion vector calculating circuit 201 calculates a motion vector and a motion vector reliability. FIGS. 8A to 8C are diagrams for explaining a motion vector calculating method. FIG. 8A illustrates image data of the M-th frame, FIG. 8B illustrates image data of the (M+1)-th frame, and FIG. 8C illustrates motion vectors between the M-th frame and the (M+1)-th frame, where M is a positive integer. For simplicity, only representative motion vectors are shown in FIG. 8C. FIG. 9 is a diagram for explaining a motion vector calculating method using block matching. Although block matching will be described as an exemplary technique used to calculate motion vectors, the technique used to calculate motion vectors is not limited to this. For example, a gradient method may be used instead.

In step S701 of FIG. 7, image data of two temporally adjacent frames is input to the motion vector calculating circuit 201. The motion vector calculating circuit 201 then defines the M-th frame as a base frame and defines the (M+1)-th frame as a reference frame.

In step S702 of FIG. 7, as in FIG. 9, the motion vector calculating circuit 201 places a base block 902 of N×N pixels in a base frame 901.

In step S703 of FIG. 7, as in FIG. 9, the motion vector calculating circuit 201 defines an (N+n)×(N+n) pixel region in a reference frame 903 as a search range 905. The (N+n)×(N+n) pixel region is a region that surrounds the same coordinates 904 as the center coordinates of the base block 902 of the base frame 901.

Figure 10:
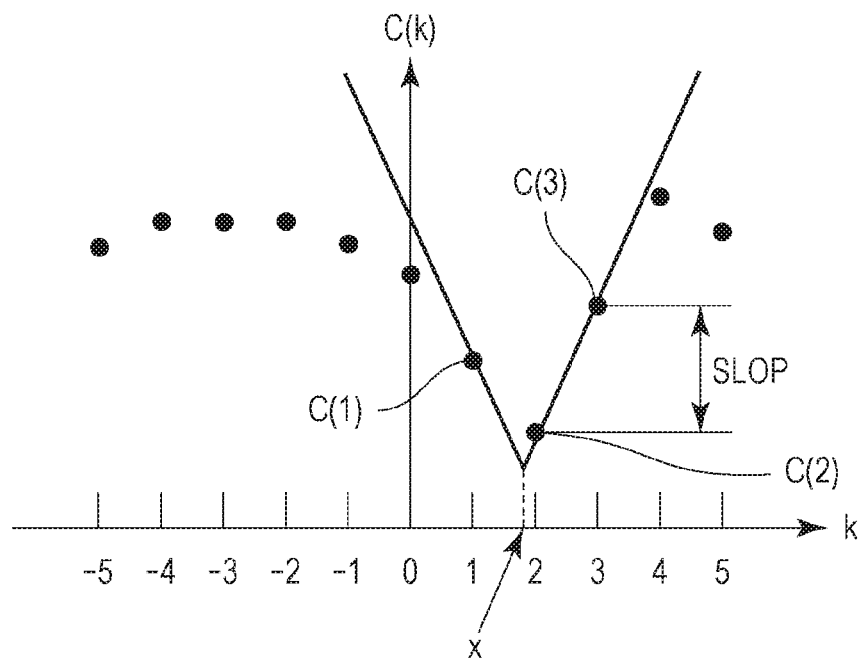
FIG. 10 is a diagram for explaining a calculation using three-point interpolation.

In step S704 of FIG. 7, the motion vector calculating circuit 201 performs a correlation operation between the base block 902 in the base frame 901 and a reference block 906 of N×N pixels existing within the search range 905 in the reference frame 903, so as to calculate a correlation value. The reference block 906 has coordinates different from the base block 902. The correlation value is calculated on the basis of the sum of inter-frame absolute differences of pixels of the base block 902 and the reference block 906. That is, coordinates at which the sum of inter-frame absolute differences is smallest, are coordinates at which the correlation value is highest. The correlation value calculating method is not limited to the method of determining the sum of inter-frame absolute differences. For example, it may be a method of calculating a correlation value on the basis of the sum of inter-frame difference squares or the normal cross-correlation value. In the example of FIG. 9, the reference block 906 has the highest correlation with the base block 902. Motion vectors can be calculated on a sub-pixel by sub-pixel basis using a known technique. Specifically, a three-point interpolation technique using the following equations (1) to (4) may be applied to continuous correlation value data C(k) shown in FIG. 10:

$$X = k + D \div SLOP \quad (1)$$

$$C(x) = C(k) - |D| \quad (2)$$

$$D = \{C(k-1) - C(k+1)\} \div 2 \quad (3)$$

$$SLOP = MAX\{C(k+1) - C(k), C(k-1) - C(k)\} \quad (4)$$

where k=2 in FIG. 10.

In the first embodiment of the present invention, the sub-pixel by sub-pixel resolution is defined as 0.5 pixels. Although (1) is an equation for the x component, the y component can be calculated in the same manner.

In step S705 of FIG. 7, the motion vector calculating circuit 201 calculates the motion vector on the basis of the coordinates of the reference block indicating the highest correlation value determined in step S704, and the correlation value of the motion vector is defined as the reliability of the motion vector. In the example of FIG. 9, the motion vector is determined, within the search range 905 in the reference frame 903, on the basis of the coordinates 904 corresponding to the center coordinates of the base block 902 in the base frame 901 and the center coordinates of the reference block 906. That is, the inter-coordinate distance and the direction from the coordinates 904 to the center coordinates of the reference block 906 are determined as the motion vector. Also, the correlation value obtained as a result of the correlation operation with the reference block 906 in the motion vector calculation described above, is determined as the reliability of the motion vector. The higher the correlation value between the base block and the reference block, the higher the reliability of the motion vector.

In step S706 of FIG. 7, the motion vector calculating circuit 201 determines whether the motion vectors of all the pixels of the base frame 901 have been calculated. If the motion vector calculating circuit 201 does not determine in step S706 that the motion vectors of all the pixels have been calculated, the process returns to step S702. In step S702, the base block 902 of N×N pixels is placed in the base frame 901, with the pixel for which the motion vector has not yet been calculated positioned at the center, and the operations in step S703 to step S705 are performed in the same manner as above. That is, while moving the base block 902 in FIG. 9, the motion vector calculating circuit 201 repeats the operations in step S702 to step S705 to calculate the motion vectors of all the pixels in the base frame 901. Exemplary motion vectors are shown in FIG. 8C. FIGS. 8A to 8C show that between the M-th frame and the (M+1)-th frame illustrated in FIG. 8A and FIG. 8B, respectively, a person is moving from left to right. FIG. 8C shows typical exemplary motion vectors of a moving subject. The motion vectors shown in FIG. 8C each have a subject position in the M-th frame as its starting point, and have the corresponding subject position in the (M+1)-th frame as its end point. Instead of calculating the motion vectors of all the pixels, the motion vector calculating circuit 201 may calculate the motion vectors of predetermined pixels fewer than all the pixels.

By the operations described above, motion vectors between two temporally adjacent, high-speed imaging frames and the reliabilities of the motion vectors are calculated.

The moving speed of the subject may change. It is thus preferable that the magnitude of motion vector between two temporally adjacent frames be converted to a moving speed in the object plane, and that the focal length, imaging magnification, and angle of view of the second optical system 124 be appropriately changed during exposure of the first image pickup element 115 by the calculating method described above.

With reference to FIG. 6, a time-series operation will be described, which is performed by the motion vector calculating circuit 201 on image data obtained by the second image pickup element 125 to calculate a motion vector and the reliability of the motion vector.

At time T1, the motion vector calculating circuit 201 calculates a motion vector between frames of image data obtained at time T0 and time T1 and the reliability of the motion vector, in accordance with the processing in the flowchart of FIG. 7. At time T2, the motion vector calculating circuit 201 calculates a motion vector between frames of image data obtained at time T1 and time T2 and the reliability of the motion vector. At time T3 and subsequent time points, the motion vector calculating circuit 201 repeats the same operation to calculate motion vectors between frames of image data obtained from the second image pickup element 125 and to also calculate the reliabilities of the motion vectors.

This is an explanation of the motion vector calculating method performed in step S320 of FIG. 4.

Referring back to FIG. 4, in step S321, the cumulative amount calculating circuit 202 tracks the motion vectors calculated in step S320 through a plurality of frames, and calculates the cumulative amount of motion vectors. Then, on the basis of the calculated cumulative amount of motion vectors, the representative cumulative amount calculating circuit 203 determines the representative cumulative amount representing the entire frame.

Figure 11:
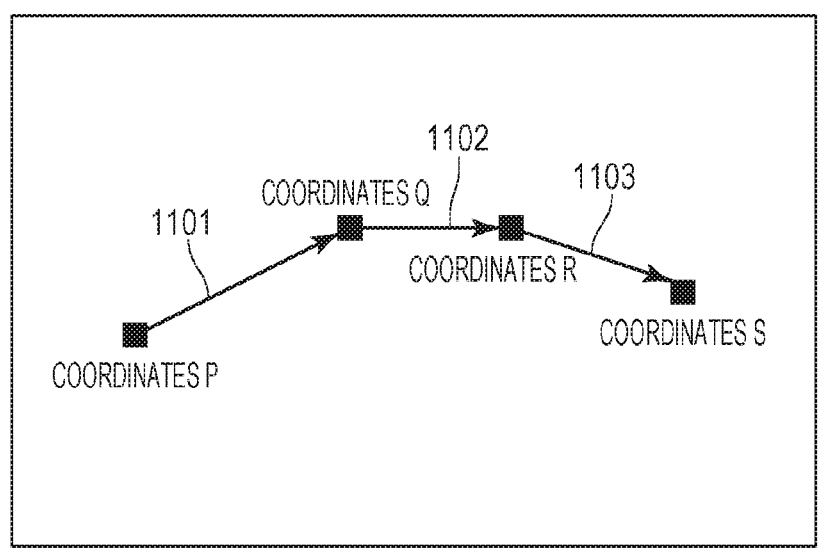
FIG. 11 illustrates motion vectors between frames.

A method for calculating the cumulative amount of motion vectors will be described using FIG. 11. FIG. 11 is a diagram illustrating motion vectors between frames calculated in step S320 of FIG. 4. To simplify the explanation, a method for calculating the cumulative amount of motion vectors only in the period from time T0 to time T3 will be described. The same method is also applicable to subsequent periods to calculate the cumulative amount of motion vectors.

Referring to FIG. 11, a motion vector 1101 represents a motion vector calculated between the frame at time T0 and the frame at time T1 in FIG. 6, a motion vector 1102 represents a motion vector calculated between the frame at time T1 and the frame at time T2 in FIG. 6, and a motion vector 1103 represents a motion vector calculated between the frame at time T2 and the frame at time T3 in FIG. 6.

The cumulative amount calculating circuit 202 searches for a motion vector that has end-point coordinates Q of the motion vector 1101 calculated between the frames at time T0 and time T1 as its starting point coordinates, among the motion vectors calculated between the frames at time T1 and time T2. Then, the cumulative amount calculating circuit 202 connects the motion vector 1102 satisfying this condition to the motion vector 1101. Similarly, the cumulative amount calculating circuit 202 searches for a motion vector that has end-point coordinates R of the motion vector 1102 calculated between the frames at time T1 and time T2 as its starting point coordinates, among the motion vectors calculated between the frames at time T2 and time T3. Then, the cumulative amount calculating circuit 202 connects the motion vector 1103 satisfying this condition to the motion vector 1102. The same processing is also performed for subsequent periods to connect motion vectors together.

Every motion vector calculated at time T0 is connected through a plurality of frames to calculate tracked motion vectors for all the pixels. The calculated tracked motion vectors show that the subject located at the coordinates P at time T0 moves to reach the coordinates Q at time T1, further moves to reach the coordinates R at time T2, and further moves to reach the coordinates S at time T3.

Next, a method will be described, in which the cumulative amount calculating circuit 202 calculates the cumulative amount of motion vectors on the basis of each tracked motion vector.

As in the following equation (5), the cumulative amount calculating circuit 202 calculates the length of a tracked motion vector as the cumulative amount of motion vectors (VecLen):

$$VecLen = VecLen1 + VecLen2 + VecLen3 \quad (5)$$

where VecLen1 is the length of the motion vector 1101 calculated between the frames at time T0 and time T1, VecLen2 is the length of the motion vector 1102 calculated between the frames at time T1 and time T2, and VecLen3 is the length of the motion vector 1103 calculated between the frames at time T2 and time T3.

On the basis of the equation (5), the cumulative amount calculating circuit 202 calculates, as the cumulative amount of motion vectors, the sum of the lengths of motion vectors included in the tracked motion vector. The cumulative amount of motion vectors is thus calculated for the tracked motion vector of every pixel to calculate the cumulative amounts of motion vectors for all the pixels.

The cumulative amount calculating circuit 202 may exclude, from the process of calculating the sum of the lengths of motion vectors using the equation (5), a motion vector with motion vector reliability lower than a predetermined value. The cumulative amount calculating circuit 202 may exclude, from the process of calculating the sum of the lengths of motion vectors using the equation (5), a motion vector with motion vector reliability lower than a predetermined value and other motion vectors temporally subsequent thereto. This enables calculation of the cumulative amount of motion vectors using only motion vectors with high motion vector reliability. Each motion vector may be divided into components in the X and Y directions to determine the sum of the lengths of motion vectors for each direction.

A method for calculating a representative cumulative amount will now be described. From the cumulative amounts of motion vectors obtained from all pixels in a frame, the representative cumulative amount calculating circuit 203 selects a largest value and determines the selected largest cumulative amount of motion vectors as a representative cumulative amount. By performing this operation frame-by-frame, one representative cumulative amount is calculated for each frame, as illustrated in FIG. 6.

The representative cumulative amount calculated by the representative cumulative amount calculating circuit 203 is not limited to that based on the largest value of the cumulative amounts of motion vectors of all pixels within a frame, and may be an average or median value of the cumulative amounts of motion vectors of all pixels within the frame. When the cumulative amount of motion vectors is divided into components in the X and Y directions, the representative cumulative amount may be determined for each direction.

Referring back to FIG. 4, in step S322, the timing determining circuit 204 determines whether the representative cumulative amount is greater than or equal to a threshold. If the representative cumulative amount is below the threshold, the process proceeds to step S323.

In step S323, the first control circuit 111 of the first image pickup system 110 determines whether the exposure time of the first image pickup element 115 has reached the exposure time set on the basis of AE control performed in step S313. If the set exposure time has not been reached, the process returns to step S322, whereas if the set exposure time has been reached, the process proceeds to step S325.

In step S325, the first control circuit 111 terminates the exposure of the first image pickup element 115.

If the timing determining circuit 204 determines in step S322 that the representative cumulative amount is greater than or equal to the threshold, the process proceeds to step S324.

In step S324, the timing determining circuit 204 outputs, to the first image pickup system 110, a signal for instructing to terminate the exposure. This operation is performed immediately after determination that the representative cumulative amount is greater than or equal to the threshold. In the example illustrated in FIG. 6, the representative cumulative amount based on the motion vectors calculated between frames up to time T8 is greater than or equal to the threshold. Therefore, at this point, the timing determining circuit 204 outputs, through the second control circuit 121 to the first image pickup system 110, a signal for instructing to terminate the exposure. If the representative cumulative amount is determined for each of the X and Y directions, the signal for instructing to terminate the exposure is output when the representative cumulative amount determined for either one of the X and Y directions is greater than or equal to the threshold.

That is, upon determination that the representative cumulative amount is greater than or equal to the threshold, the process immediately proceeds to step S325, where the first control circuit 111 terminates the exposure of the first image pickup element 115 even if the exposure time of the first image pickup element 115 has not yet reached an appropriate length of time. Then, the first control circuit 111 outputs an analog image signal generated by the first image pickup element 115 to the first A/D converter circuit 116. The corresponding digital image signal generated by the first A/D converter circuit 116 is subjected to predetermined processing by the first image processing circuit 117 and output to the image output circuit 118 as image data to be recorded. By the image output circuit 118, the image data to be recorded is written onto a recording medium removable from the image pickup apparatus 100, or is transmitted to an external device, such as a smartphone or a server, using a wireless or wired communication function.

In the example illustrated in FIG. 6, the first control circuit 111 terminates the exposure of the first image pickup element 115 a little later than time T8. In practice, there may be time lags, such as the time taken to calculate the representative cumulative amount after a frame image at time T8 is generated by the second image pickup element 125 and the time necessary for a signal output from the timing determining circuit 204 to reach the first control circuit 111. However, if the threshold is determined by taking these time lags into consideration, it is possible to reduce the impact of the time lags.

In step S326, the second control circuit 121 of the second image pickup system 120 terminates the exposure of the second image pickup element 125.

In step S327, the first control circuit 111 of the first image pickup system 110 determines whether the photographing mode remains selected. If the photographing mode remains selected, the process returns to step S306, whereas if another mode is selected, the process returns to step S302.

As described above, in the first embodiment, the exposure of the first image pickup element 115 is terminated on the basis of the amount of subject motion during the period of exposure of the first image pickup element 115. This enables an image with less blur to be captured.

The magnitude of blur can be adjusted by adjusting the threshold to be compared with the representative cumulative amount in step S322. For example, by setting the threshold to a value equivalent to the amount of movement with no blur, the exposure of the first image pickup element 115 can be terminated before occurrence of blur.

If the threshold used when the user selects the blur level "normal" in step S304 of FIG. 3 is set to, for example, a value equivalent to three times the diameter of permissible circle of confusion, an image containing blur corresponding to this value can be captured. In this case, in step S314, the amount of shift of the focal length to the telephoto end is reduced, and the second image pickup system 120 calculates motion vectors by referring to an image with a wider angle of view.

The first embodiment has described an example where the timing determining circuit 204 gives an instruction to terminate the exposure upon determination that the representative cumulative amount is greater than or equal to the threshold. However, the configuration is not limited to this. For example, even when the latest representative cumulative amount is still below the threshold, if the representative cumulative amount is predicted to significantly exceed the threshold in the next frame, the timing determining circuit 204 may give an instruction to terminate the exposure on the basis of the current frame. When the representative cumulative amount significantly exceeds the threshold in the next frame, the occurrence of blur is inevitable even if an instruction to terminate the exposure is given at the timing of the next frame. Therefore, if the representative cumulative amount is predicted to significantly exceed the threshold in the next frame, an instruction to terminate the exposure is given at the timing of the current frame. The determination of whether the threshold will be significantly exceeded may be made, for example, by setting a second threshold sufficiently larger than the threshold described above and then determining whether the predicted representative cumulative amount for the next frame is greater than or equal to this second threshold.

The predicted representative cumulative amount for the next frame (VecLen_PRED) may be calculated, for example as in the following equation (6), on the basis of the cumulative amount of motion vectors obtained by doubling the length of the latest motion vector:

$$VecLen\_PRED = VecLen1 + VecLen2 + 2 \times VecLen3 \quad (6)$$

where VecLen3 is the length of the latest motion vector calculated between the frames at time T2 and time T3.

The predicted cumulative amount of motion vectors obtained in the next frame is calculated in this manner for all the pixels, and the largest value in the frame is defined as a representative cumulative amount.

The first embodiment has described an example where the exposure of the entire frame of the first image pickup element 115 is terminated in accordance with a signal output from the timing determining circuit 204. However, the configuration is not limited to this. For example, if the exposure time of the first image pickup element 115 can be controlled line-by-line, region-by-region, or pixel-by-pixel, then the timing determining circuit 204 may output a signal for terminating the exposure on the basis of the cumulative amount determined line-by-line, region-by-region, or pixel-by-pixel of the first image pickup element 115. Alternatively, the timing determining circuit 204 may divide the entire frame into blocks, and output a signal for terminating the exposure for each block on the basis of the cumulative amount representing the block.

The first embodiment has described an example in which, as the cumulative amount of motion vectors, the cumulative amount calculating circuit 202 calculates the length of the tracked motion vector by determining the sum of the lengths of motion vectors connected to each other. However, the configuration is not limited to this. If all or some of the motion vectors included in the tracked motion vector, such as that illustrated in FIG. 11, pass through the same coordinate point, the length that passes through the same coordinate point may be excluded from the process of calculating the sum of the lengths of motion vectors using the equation (5). This can reduce excessive addition of the lengths of motion vectors for a subject having small cyclic motion (repetitive motion) which involves, for example, going back and forth between adjacent coordinate points.

In the first embodiment, the timing of when to terminate the exposure of the first image pickup element 115 is determined on the basis of the result of motion analysis using an image obtained by changing the focal length, imaging magnification, and angle of view of the second image pickup system 120. Therefore, even when the first image pickup element 115 and the second image pickup element 125 have specifications that differ in resolution, an image with less blur can be captured.

In the first embodiment, the motion resolution is increased by shifting the focal length of the second optical system 124 toward the telephoto end. However, shifting the focal length of a typical lens toward the telephoto end increases the F-number and darkens the image. Increasing the sensitivity to make the image brighter results in an increased level of noise and deteriorates the accuracy of motion vector calculation. The maximum amount by which the focal length is shifted may be limited to a certain value depending on the size of the noise component of the image obtained by the second image pickup element 125.

Second Embodiment

A second embodiment of the present invention will now be described. In the second embodiment, the cumulative amount calculating circuit 202 performs processing for converting a motion vector calculated by the motion vector calculating circuit 201 to a value appropriate for the first image pickup system 110, on the basis of a sampling pitch. In the present embodiment, the sampling pitch refers to a spacing between pixels of an image that is referred to for motion analysis in the timing generator circuit 200. If the image is referred to without reducing the number of pixels, the pixel pitch is equivalent to the sampling pitch. Conversely, if pixels are added, dropped, or interpolated while being read out in the second image pickup element 125, the sampling pitch differs from the pixel pitch. Even when the number of pixels to be read out remains the same, the sampling pitch can be practically changed by applying a low-pass filter to limit the frequency band of image data.

The second embodiment differs from the first embodiment in part of the configuration of the second image pickup element 125. FIG. 12B is a table that compares the configurations of the first image pickup element 115 and the second image pickup element 125 according to the present embodiment.

FIG. 12B shows that although the first image pickup element 115 and the second image pickup element 125 are equal in the horizontal size of the image pickup portion, the number of pixels in the horizontal direction, and pixel pitch, the second image pickup element 125 reads fewer pixels than the first image pickup element 115 because it acquires images at a higher frame rate. The frame rate may be changed by changing the number of pixels to be read.

Although the focal length of the second optical system 124 can be changed in the first embodiment, the focal length of the second optical system 124 is fixed in the second embodiment. The timing of when to terminate the exposure of the first image pickup system 110 is determined on the basis of the result of motion analysis of images obtained from the second image pickup element 125. Accordingly, the motion resolution of the second image pickup system 120 needs to be higher than the motion resolution of the first image pickup system 110. Therefore, the focal length of the second optical system 124 is preferably fixed at a value longer than the maximum focal length of the first optical system 114.

Figure 13:
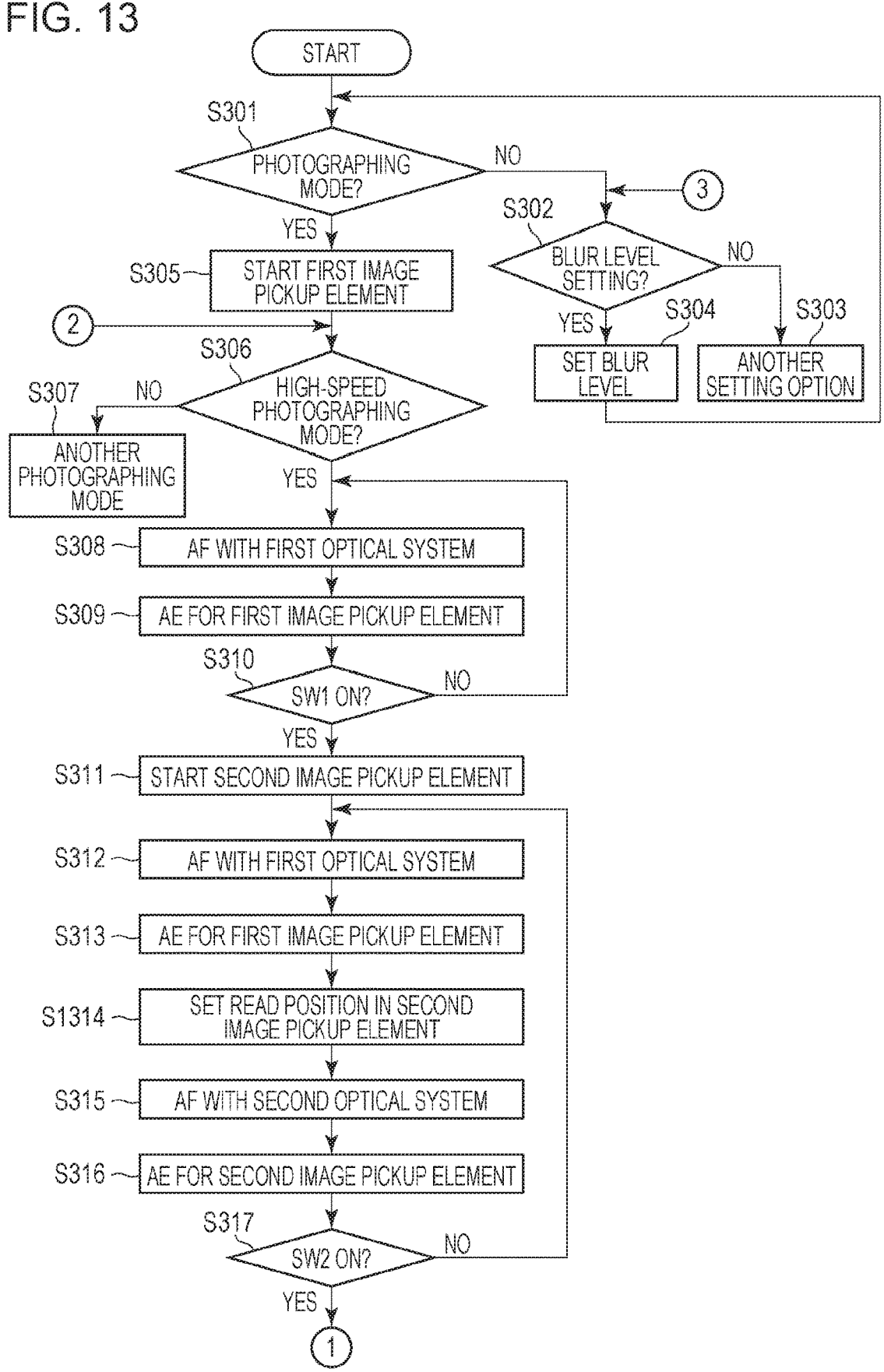
FIG. 13 is a flowchart illustrating image pickup processing in high-speed photographing mode according to the second embodiment of the present invention.
Figure 14:
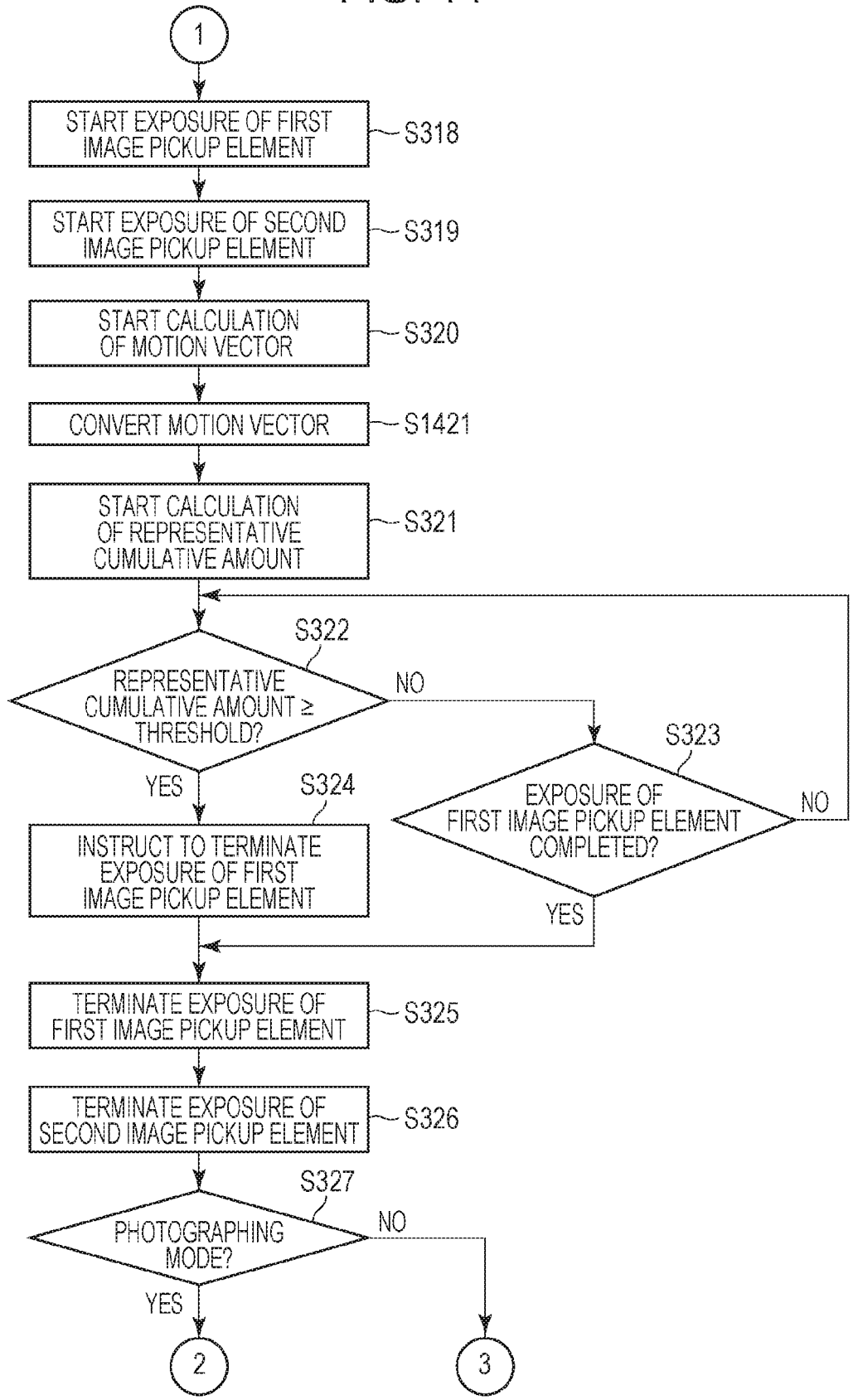
FIG. 14 is another flowchart illustrating the image pickup processing in high-speed photographing mode according to the second embodiment of the present invention.

With reference to the flowcharts of FIGS. 13 and 14, image pickup processing in the high-speed photographing mode of the image pickup apparatus 100 according to the second embodiment of the present invention will be described. FIGS. 13 and 14 are flowcharts illustrating image pickup processing in the high-speed photographing mode according to the second embodiment. Note that steps where the same operations as those in the flowcharts of FIGS. 3 and 4 of the first embodiment are performed, are denoted by the same step numbers as those in FIGS. 3 and 4. Operations different from those of the first embodiment will be described here.

In the second embodiment, the relation between the image pickup apparatus 100 and the subject is the same as that illustrated in FIG. 5, and the focal length of the second optical system 124 is fixed at 600 mm, which is longer than the focal length (300 mm) of the first optical system 114.

The operations in step S301 to step S313 in FIG. 13 are the same as those in step S301 to step S313 in FIG. 3.

In step S1314 of FIG. 13, the second control circuit 121 determines a read position in the second image pickup element 125. The second control circuit 121 defines a region for reading a signal in the image pickup portion of the second image pickup element 125, such that the subject 500 in FIG. 5 is within the field of view. By changing the read position, even when the subject 500 moves out of the vicinity of the optical axis, the subject 500 can be kept within the field of view. The field of view can be further moved by moving the optical axis or the image pickup element, as in the first embodiment of the present invention.

The operations in step S315 to step S320 of FIGS. 13 and 14 are the same as those in step S315 to step S320 of FIGS. 3 and 4.

In step S1421 of FIG. 14, the cumulative amount calculating circuit 202 performs conversion of the motion vectors calculated in step S320, on the basis of the sampling pitch. The method of this conversion will now be described in detail.

When the image of a subject 40 m ahead is captured with a focal length of 600 mm, the imaging magnification is 40×1000÷600=66.6. To capture an image with blur not exceeding a permissible value in the first image pickup element 115, the second image pickup system 120 is required to have a motion resolution of 0.6 mm per unit frame (1 millisecond), as in the first embodiment. The sampling pitch that satisfies this is 0.6×1000÷66.6=9.0 μm. As in FIG. 12B, since the second image pickup element 125 has a pixel pitch of 5.62 μm, the motion vector is converted to make this equivalent to 9.0 μm. For example, if the motion vector calculated in step S320 is 1.2 pixels, the motion vector obtained by this conversion is 1.2×9.0÷5.62=1.92 pixels. By using this motion vector obtained by conversion, a representative cumulative amount is calculated in step S321, and the timing determining circuit 204 determines in step S322 whether the representative cumulative amount is greater than or equal to a threshold.

For both the first image pickup system 110 and the second image pickup system 120, the product of the imaging magnification and the sampling pitch (or pixel pitch here) is calculated as a value representing the resolution of motion analysis. The products calculated for the first image pickup system 110 and the second image pickup system 120 are 5.62×133.3=749.1 μm and 9.0×66.6=599.4 μm, respectively. This shows that the second image pickup system 120 is capable of resolving finer motions (or has higher resolution). When the focal length of the first optical system 114 is variable, the product of the imaging magnification and the sampling pitch changes in accordance with the focal length. Therefore, for example, the focal length of the second optical system 124 may be designed such that the product of the imaging magnification and the sampling pitch for the second image pickup system 120 is less than or equal to the minimum product of the imaging magnification and the sampling pitch for the first image pickup system 110.

The operations in step S321 to step S327 of FIG. 14 are the same as those in step S321 to step S327 of FIG. 4.

The moving speed of the subject may change during the process. Therefore, in accordance with the magnitude of motion vectors calculated from consecutive frames, the sampling pitch for converting the motion vectors during exposure of the first image pickup element 115, or the reading resolution of the second image pickup element 125, may be appropriately changed.

As described above, in the second embodiment, by converting the motion vector calculated in the second image pickup system 120 to a value appropriate for the first image pickup system 110 on the basis of the sampling pitch, the correct timing of when to terminate exposure can be determined. Even when the focal length of the second optical system 124 of the second image pickup system 120 is fixed, the amount of subject motion in an image obtained by the first image pickup system 110 can be accurately detected. The present embodiment has described an example where the motion vector is converted to a value appropriate for the first image pickup system 110. Alternatively, the threshold with which the representative cumulative amount is compared in step S322 may be converted to a value appropriate for the second image pickup system 120.

Third Embodiment

A third embodiment of the present invention will now be described. The third embodiment differs from the first embodiment in that the timing of when to terminate exposure is determined on the basis of the result of motion analysis using absolute differences between frames, instead of motion vectors.

Specifically, in the third embodiment, the second image processing circuit 127 of the second image pickup system 120 includes a timing generator circuit 1500 (see FIG. 15), instead of the timing generator circuit 200 illustrated in FIG. 2.

The configuration of the timing generator circuit 1500 included in the second image processing circuit 127 will now be described using FIG. 15.

Figure 15:
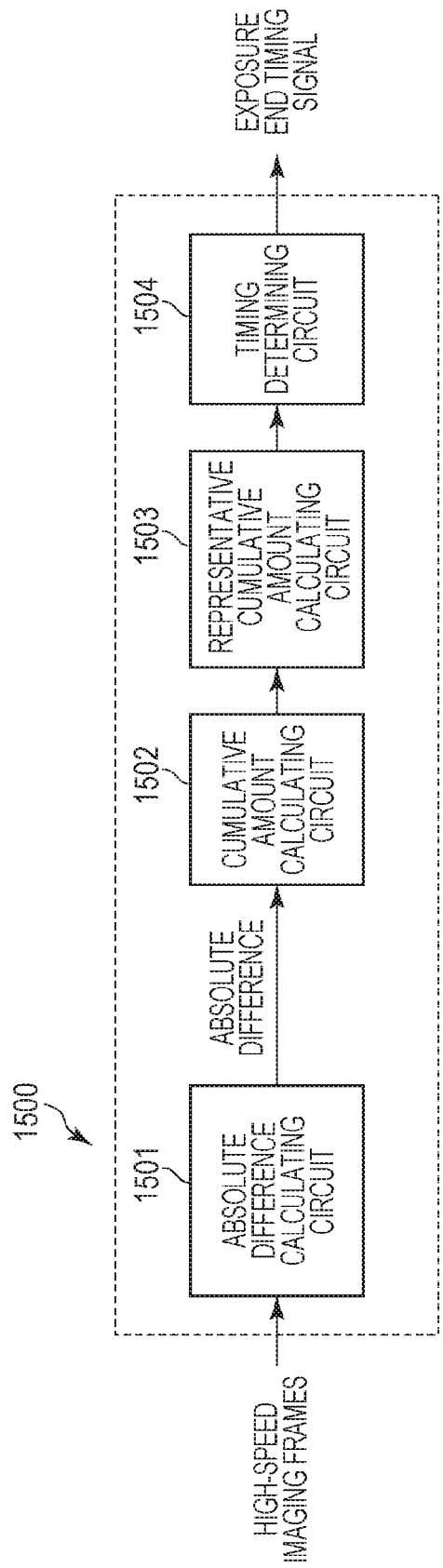
FIG. 15 is a block diagram illustrating an exemplary configuration of a timing generator circuit according to a third embodiment of the present invention.

FIG. 15 is a block diagram illustrating an exemplary configuration of the timing generator circuit 1500 according to the third embodiment. Referring to FIG. 15, the timing generator circuit 1500 includes an absolute difference calculating circuit 1501, a cumulative amount calculating circuit 1502, a representative cumulative amount calculating circuit 1503, and a timing determining circuit 1504.

Figure 16:
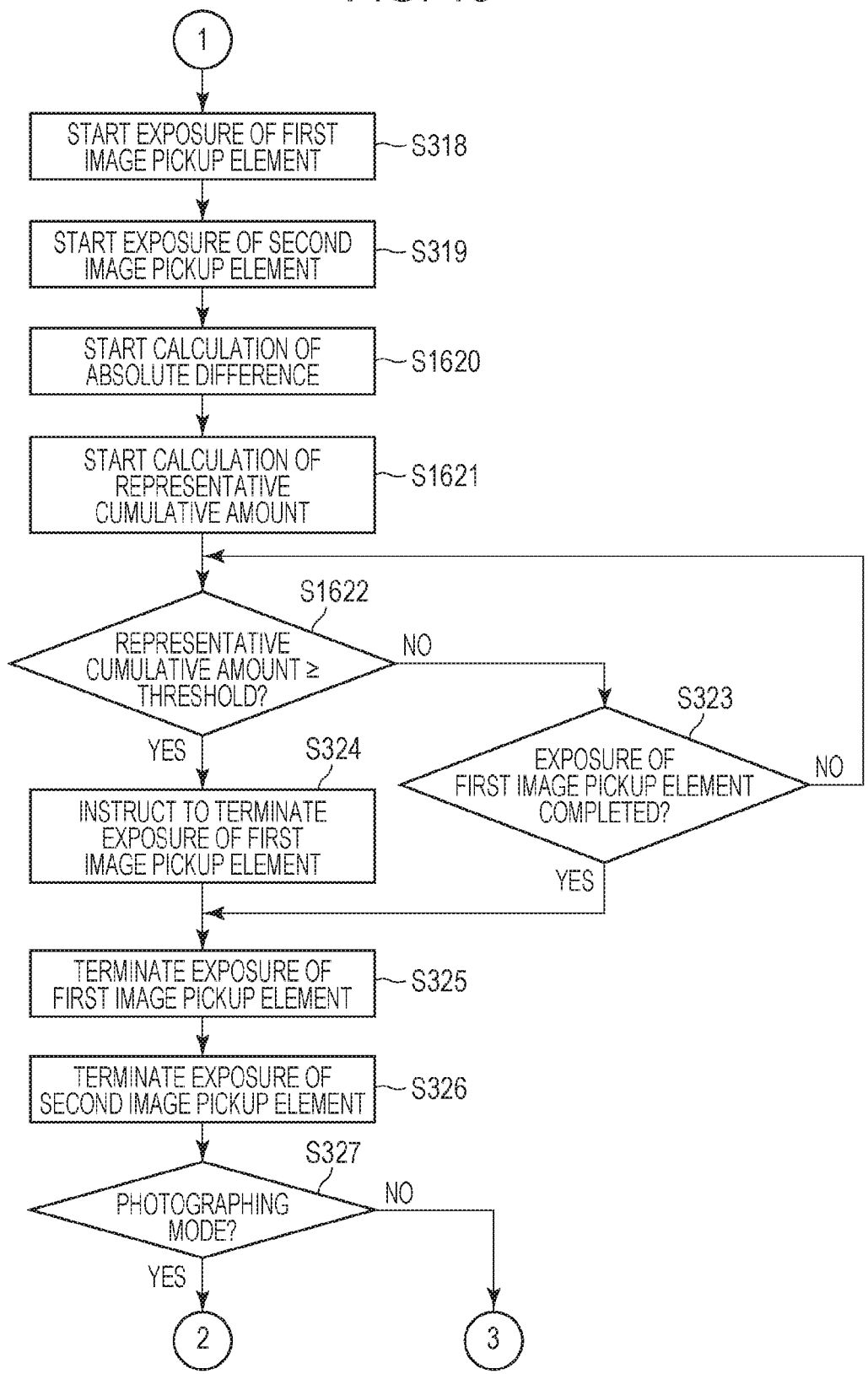
FIG. 16 is a flowchart illustrating image pickup processing in high-speed photographing mode according to the third embodiment of the present invention.

With reference to the flowchart of FIG. 16, image pickup processing in the high-speed photographing mode of the image pickup apparatus 100 according to the third embodiment of the present invention will be described. FIG. 16 is a flowchart illustrating image pickup processing in high-speed photographing mode according to the third embodiment.

Although image pickup processing in the high-speed photographing mode has been described using FIGS. 3 and 4 in the first embodiment, the flowchart of FIG. 16, instead of FIG. 4, will be used in the third embodiment. The operations illustrated in FIG. 3 will not be described here, as they are the same as those of the first embodiment. In FIG. 16, steps where the same operations as those in the flowchart of FIG. 4 of the first embodiment are performed, are denoted by the same step numbers as those in FIG. 4. Operations different from those of the first embodiment will be described here.

In step S1620 of FIG. 16, the absolute difference calculating circuit 1501 in the timing generator circuit 1500 calculates an inter-frame absolute difference for image data obtained by the second image pickup element 125. The inter-frame absolute difference is a value obtained by determining, for each pixel, an absolute difference between the values of pixels at the same coordinates between frames obtained by the second image pickup element 125.

Figure 17:
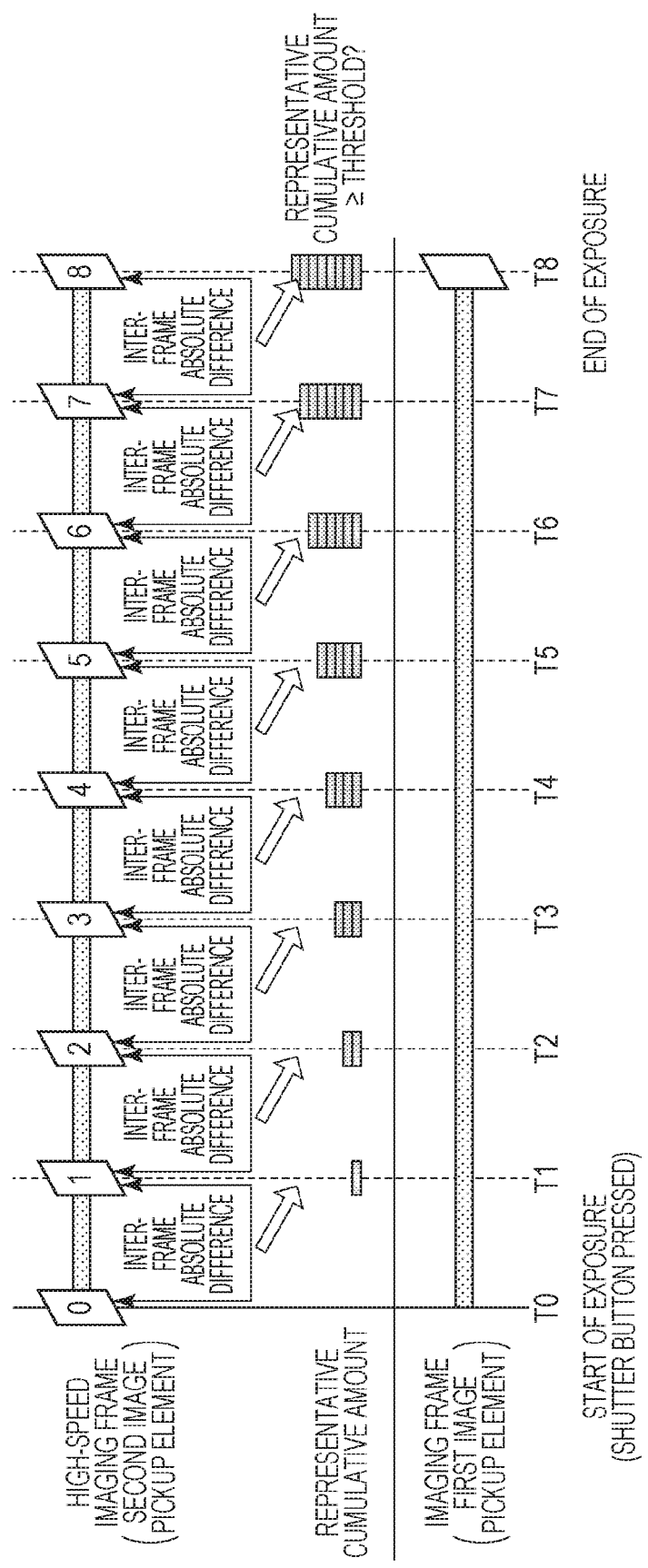
FIG. 17 is a diagram for explaining an operation performed by a first image pickup element, a second image pickup element, and the timing generator circuit according to the third embodiment of the present invention.

With reference to FIG. 17, a time-series operation will be described, which is performed by the absolute difference calculating circuit 1501 on image data obtained by the second image pickup element 125 to calculate an absolute difference. FIG. 17 is a diagram for explaining an operation performed by the first image pickup element 115, the second image pickup element 125, and the timing generator circuit 1500.

At time T1, the absolute difference calculating circuit 1501 calculates, for each pixel, an inter-frame absolute difference for image data obtained at time T0 and time T1. At time T2, the absolute difference calculating circuit 1501 calculates, for each pixel, an inter-frame absolute difference for image data obtained at time T1 and time T2. At time T3 and subsequent time points, the absolute difference calculating circuit 1501 repeats the same operation to calculate, for each pixel, an absolute difference between frames of image data obtained from the second image pickup element 125.

In step S1621, as in the following equation (7), the cumulative amount calculating circuit 1502 adds up the absolute differences calculated for each pixel over a plurality of frames, in step S1620, to determine the cumulative amount of absolute differences (AD):

$$AD=AD1+AD2+AD3 \quad (7)$$

where AD1 is an absolute difference of one pixel calculated between the frame at time T0 and the frame at time T1, AD2 is an absolute difference of the same pixel calculated between the frame at time T1 and the frame at time T2, and AD3 is an absolute difference of the same pixel calculated between the frame at time T2 and the frame at time T3.

Thus, by calculating the cumulative amount of absolute differences between frames for all pixels, the cumulative amount calculating circuit 1502 determines the cumulative amount of inter-frame absolute differences for all the pixels within a frame.

Additionally, on the basis of the cumulative amount of inter-frame absolute differences calculated pixel-by-pixel, the representative cumulative amount calculating circuit 1503 calculates a cumulative amount representing the entire frame. Specifically, the representative cumulative amount calculating circuit 1503 selects the largest of the cumulative amounts of absolute differences calculated for all the pixels, and determines the selected largest cumulative amount of absolute differences as a representative cumulative amount. By performing this operation frame-by-frame, one representative cumulative amount is calculated for each frame, as illustrated in FIG. 17.

The representative cumulative amount calculated by the representative cumulative amount calculating circuit 1503 is not limited to that based on the largest value of the cumulative amounts of absolute differences of all pixels within a frame, and may be an average or median value of the cumulative amounts of absolute differences of all pixels within the frame.

In step S1622, the timing determining circuit 1504 determines whether the representative cumulative amount is greater than or equal to a threshold. If the representative cumulative amount is below the threshold, the process proceeds to step S323, whereas if the representative cumulative amount is greater than or equal to the threshold, the process proceeds to step S324. The operations in step S324 and subsequent steps are the same as those in step S324 and subsequent steps of FIG. 3.

That is, upon determining that the representative cumulative amount is greater than or equal to the threshold, the timing determining circuit 1504 outputs, through the second control circuit 121 to the first image pickup system 110, a signal for instructing to terminate the exposure. The first control circuit 111 terminates the exposure of the first image pickup element 115 even if the exposure time of the first image pickup element 115 has not yet reached an appropriate length of time. Then, the first control circuit 111 outputs an analog image signal generated by the first image pickup element 115 to the first A/D converter circuit 116.

In the third embodiment, again, the exposure of the first image pickup element 115 is terminated on the basis of the amount of subject motion during the period of exposure of the first image pickup element 115. This enables an image with less blur to be captured. Since the amount of subject motion is determined using absolute differences, instead of motion vectors, the amount of computation can be made smaller than that when motion vectors are used. It is thus possible to expect a reduction in computational load and time.

Fourth Embodiment

A fourth embodiment of the present invention will now be described. The fourth embodiment differs from the first to third embodiments in that a plurality of high-speed photographing modes are prepared, and that one of the high-speed photographing modes is set on the basis of the result of preliminary analysis of subject motion.

The configuration of the image pickup apparatus 100 according to the fourth embodiment is the same as that according to the first embodiment. With reference to the flowchart of FIG. 18, image pickup processing in the high-speed photographing mode of the image pickup apparatus 100 according to the fourth embodiment will be described.

Figure 18:
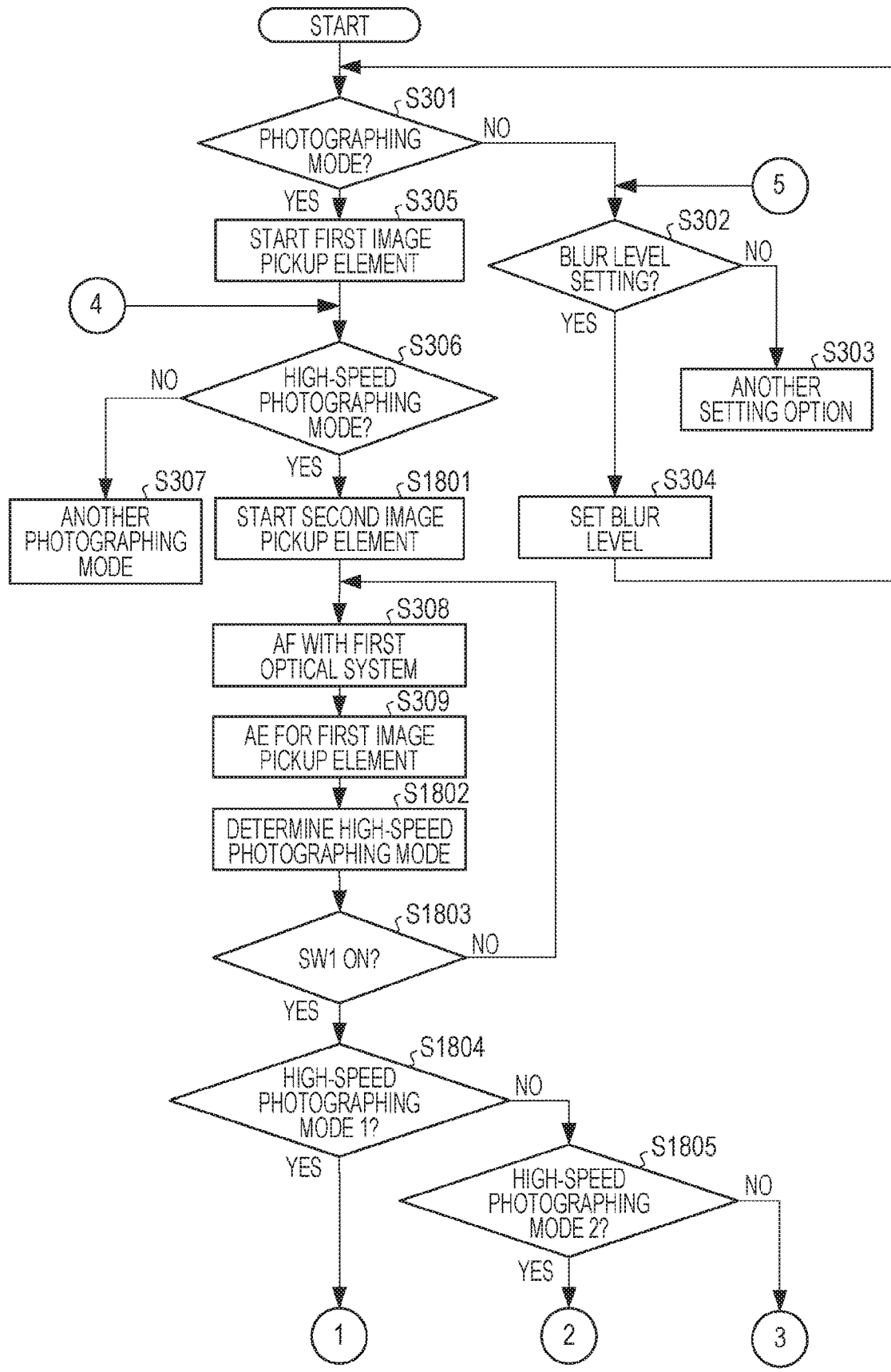
FIG. 18 is a flowchart illustrating image pickup processing in high-speed photographing mode according to the fourth embodiment of the present invention.

In FIG. 18, steps where the same operations as those in the flowchart of FIG. 3 of the first embodiment are performed, are denoted by the same step numbers as those in FIG. 3.

If the first control circuit 111 determines in step S306 of FIG. 18 that the high-speed photographing mode is selected as a photographing mode, the process proceeds to step S1801.

In step S1801, the second control circuit 121 starts the second image pickup element 125. In the first embodiment, the second image pickup element 125 is started after SW1 is turned on. In the present embodiment, however, the second image pickup element 125 is started immediately after determination that the high-speed photographing mode is selected. The frame rate of the second image pickup element 125 is 1000 fps at this point.

In step S308, on the basis of the contrast level of the subject obtained from the first image pickup element 115 or the output of the focus detecting sensor (not shown), the first control circuit 111 drives the first optical system 114 to perform AF control.

In step S309, on the basis of the luminance value of the subject obtained from the first image pickup element 115, the first control circuit 111 performs AE control for the first image pickup element 115.

In step S1802, the first control circuit 111 performs a process of determining a high-speed photographing mode. This process of determining a high-speed photographing mode will now be described using FIG. 19.

Figure 19:
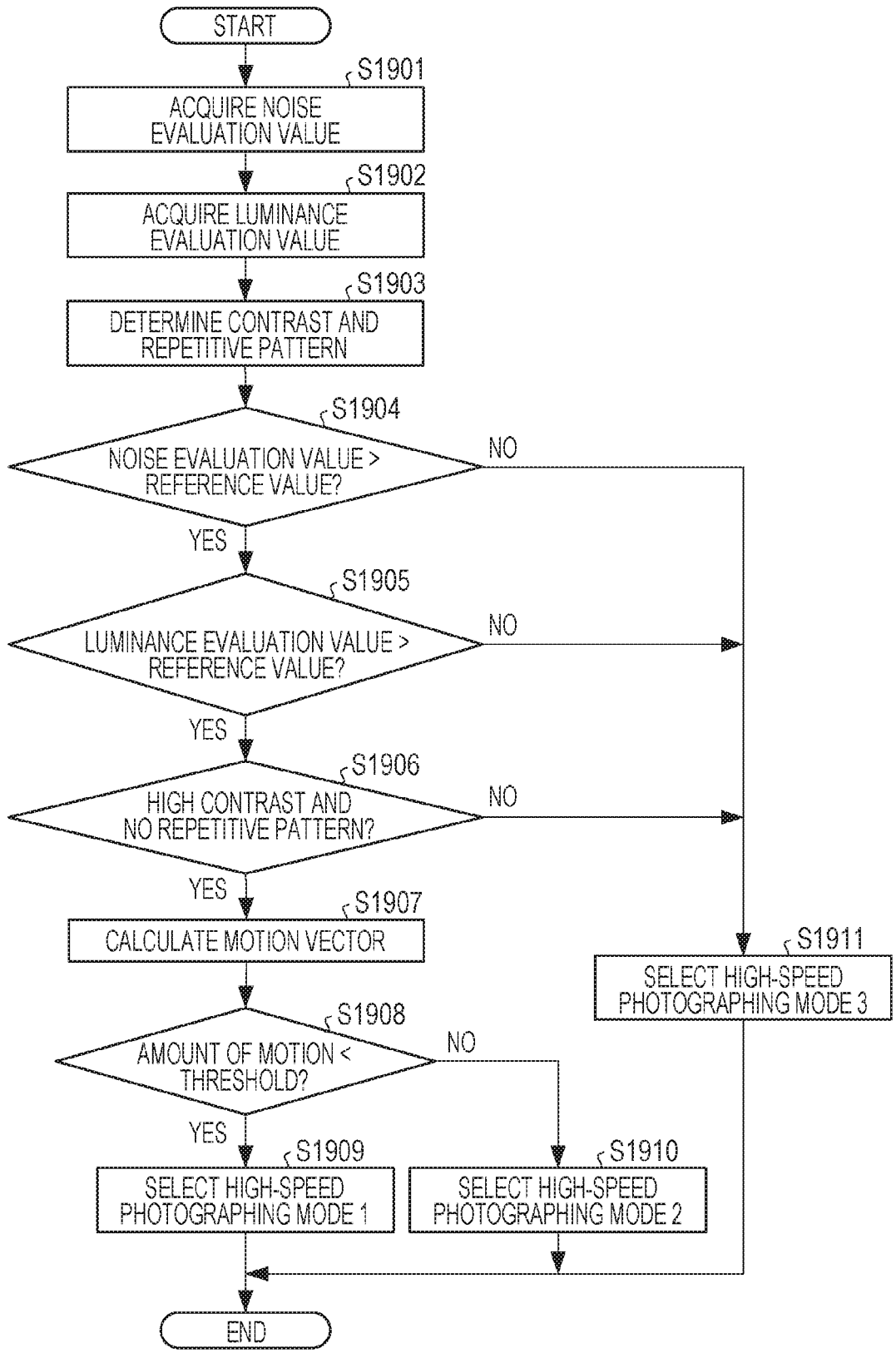
FIG. 19 is a flowchart illustrating a process of determining a high-speed photographing mode according to the fourth embodiment of the present invention.

FIG. 19 is a flowchart illustrating how the first control circuit 111 determines a high-speed photographing mode.

In step S1901, the first control circuit 111 acquires a noise evaluation value. For each ISO speed and luminance level, a noise evaluation value converted from the result of noise measurement in the second image pickup element 125 is stored in the first ROM 112 in advance. From the ISO speed already set when the process proceeds to step S1802 and the luminance information of the subject obtained in step S309 of FIG. 18, the first control circuit 111 reads a corresponding noise evaluation value. The lower the measured noise level, the higher the noise evaluation value. Instead of reading a noise evaluation value from a table, the first control circuit 111 may calculate a noise evaluation value on the basis of the value of dispersion of signal levels in the light-shielding region of the second image pickup element 125 calculated by the second control circuit 121. The smaller the value of dispersion of signal levels in the light-shielding region of the second image pickup element 125, the higher the noise evaluation value.

In step S1902, the second control circuit 121 counts the number of saturated and underexposed pixels included in the second image pickup element 125, and the first control circuit 111 acquires a luminance evaluation value corresponding to this count from the table. The fewer the number of saturated and underexposed pixels, the higher the noise evaluation value.

In step S1903, by using the second image processing circuit 127, the second control circuit 121 extracts edges from image data obtained by the second image pickup element 125. On the basis of the result of edge extraction, the first control circuit 111 determines whether the image data has high contrast and includes no repetitive pattern.

Specifically, the second image processing circuit 127 extracts edge components using, for example, a Sobel filter or a high-pass filter. The second image processing circuit 127 determines the value of dispersion of the extracted edge components. If the value of dispersion is higher than a predetermined reference value, the first control circuit 111 determines that the image data obtained from the second image pickup element 125 has high contrast. Additionally, the second image processing circuit 127 compares extracted edge components between regions. If there are a plurality of similar edge components, the first control circuit 111 determines that the image data is highly likely to include a repetitive pattern.

If the first control circuit 111 determines in step S1904 that the noise evaluation value is higher than a reference value for noise evaluation, the process proceeds to step S1905 and otherwise, the process proceeds to step S1911. If the noise evaluation value is low or the noise level is high, the accuracy of detecting the amount of motion using the second image pickup element 125 is not sufficient. In this case, the process proceeds to step S1911, where high-speed photographing mode 3 (described below) is selected.

If the first control circuit 111 determines in step S1905 that the luminance evaluation value is higher than a reference value for luminance evaluation, the process proceeds to step S1906 and otherwise, the process proceeds to step S1911. If the luminance evaluation value is low or there are many saturated and underexposed pixels, the accuracy of detecting the amount of motion using the second image pickup element 125 is not sufficient. In this case, the process proceeds to step S1911, where high-speed photographing mode 3 (described below) is selected.

If the first control circuit 111 determines in step S1906 that the image data obtained from the second image pickup element 125 has high contrast and includes no repetitive pattern, the process proceeds to step S1907. If the image data at least has low contrast or includes a repetitive pattern, the accuracy of detecting the amount of motion using the second image pickup element 125 is not sufficient. In this case, the process proceeds to step S1911, where high-speed photographing mode 3 (described below) is selected.

In step S1907, the second control circuit 121 calculates, using the motion vector calculating circuit 201 of the second image processing circuit 127, motion vectors and motion vector reliabilities between frames of image data obtained in the second image pickup element 125.

In step S1908, the first control circuit 111 receives, from the second control circuit 121, the motion vectors and the motion vector reliabilities calculated in step S1907 and determines whether the amount of motion represented by a motion vector with high reliability is below a threshold. This operation will now be described in detail.

FIG. 12C is a table that compares the configurations of the first image pickup element 115 and the second image pickup element 125 according to the present embodiment. The first image pickup element 115 and the second image pickup element 125 are 36 mm and 3.6 mm, respectively, in the horizontal size of the image pickup portion. The first image pickup element 115 and the second image pickup element 125 have 7200 pixels and 720 pixels, respectively, in the horizontal direction. The first image pickup element 115 and the second image pickup element 125 both have a pixel pitch of 5 μm. The first image pickup element 115 has a frame rate of 20 fps, whereas the second image pickup element 125 has a frame rate of 1000 fps.

In the present embodiment, again, the diameter of permissible circle of confusion is 20 μm, which is equivalent to the pitches of four pixels of the first image pickup element 115.

The threshold with which the amount of motion is compared in step S1908 is determined by the resolution ratio between the first image pickup element 115 and the second image pickup element 125. The threshold in the present embodiment is 4×720÷7200=0.4 pixels. That is, if the amount of motion represented by a motion vector detected by the second image pickup element 125 is less than 0.4 pixels, an image with less blur can be captured by terminating the exposure of the first image pickup element 115 in accordance with an exposure end timing signal transmitted from the second image pickup system 120. In this case, the process proceeds to step S1909.

On the other hand, if the subject moves fast and the amount of motion detected by the second image pickup element 125 is equivalent to 2 pixels, which is greater than 0.4 pixels, the amount of motion in the first image pickup element 115 is equivalent to 20 pixels. In this case, an image with less blur cannot be captured even if the exposure of the first image pickup element 115 is terminated in accordance with an exposure end timing signal transmitted from the second image pickup system 120. In this case, the process proceeds to step S1910.

In step S1909, the first control circuit 111 selects high-speed photographing mode 1 (described below) and ends the flow illustrated in FIG. 19.

In step S1910, the first control circuit 111 selects high-speed photographing mode 2 (described below) and ends the flow illustrated in FIG. 19.

In step S1911, the first control circuit 111 selects high-speed photographing mode 3 (described below) and ends the flow illustrated in FIG. 19.

Referring back to FIG. 18, in step S1803, the first control circuit 111 determines whether SW1 in the shutter switch included in the operation member 130 has been turned on by pressing the shutter switch halfway down. Steps S308 to S1802 are repeated until SW1 is determined to be "on".

If determining in step S1803 that SW1 is on, the first control circuit 111 further determines in step S1804 whether high-speed photographing mode 1 is selected. If determining that high-speed photographing mode 1 is selected, the first control circuit 111 performs image pickup processing in high-speed photographing mode 1 illustrated in FIG. 20.

Figure 20:
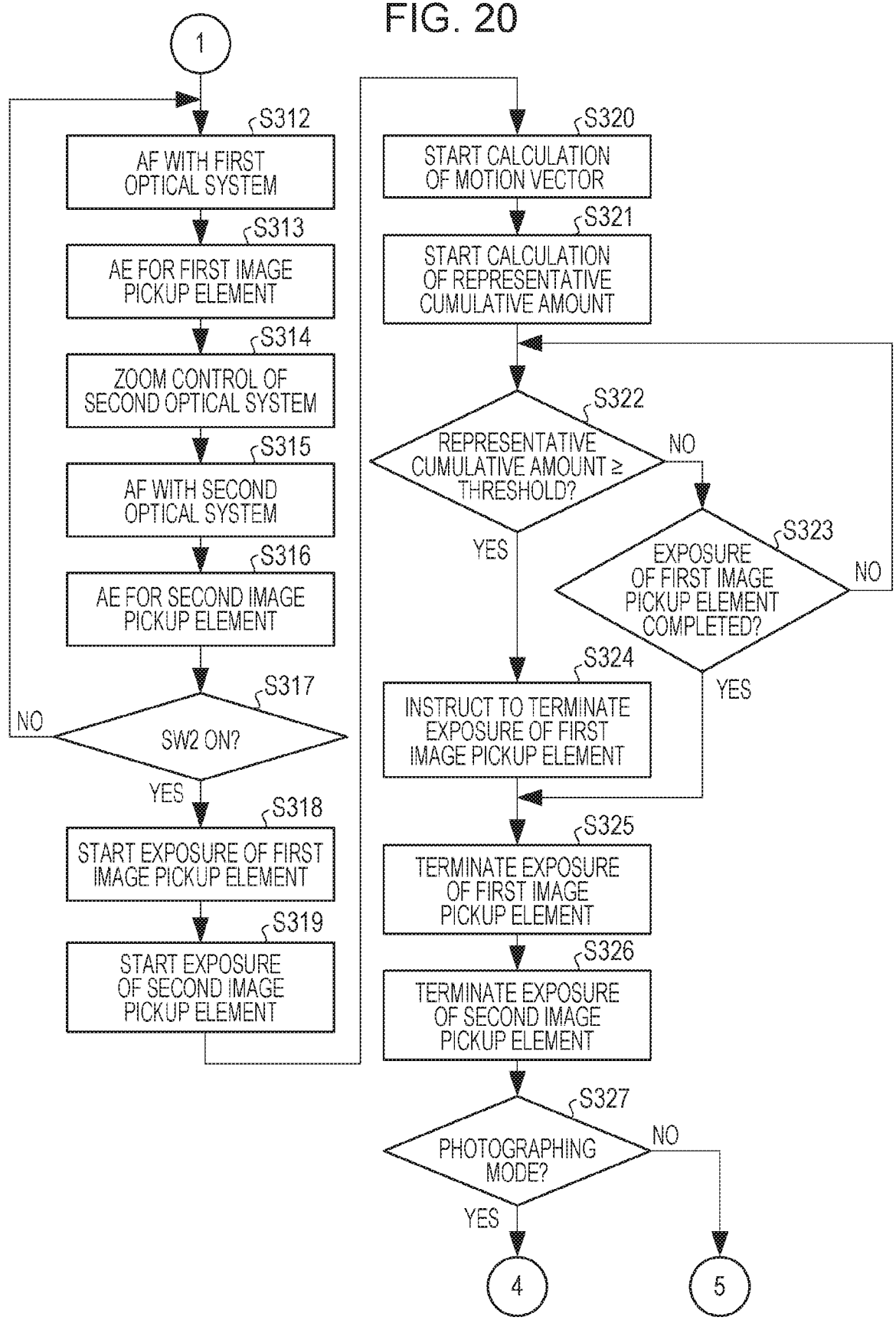
FIG. 20 is a flowchart illustrating image pickup processing in high-speed photographing mode 1 according to the fourth embodiment of the present invention.

FIG. 20 is a flowchart illustrating how the first control circuit 111 performs image pickup processing in high-speed photographing mode 1. The operations in step S312 to step S327 in FIG. 20 are the same as those in step S312 to step S327 in FIGS. 3 and 4. That is, in high-speed photographing mode 1, as in the first embodiment, the first control circuit 111 terminates the exposure of the first image pickup element 115 in accordance with an exposure end timing signal transmitted from the second image pickup system 120.

Referring back to FIG. 18, if determining in step S1804 that high-speed photographing mode 1 is not selected, the first control circuit 111 determines in step S1805 whether high-speed photographing mode 2 is selected. If determining that high-speed photographing mode 2 is selected, the first control circuit 111 performs image pickup processing in high-speed photographing mode 2 illustrated in FIG. 21, whereas if determining that high-speed photographing mode 2 is not selected, the first control circuit 111 performs image pickup processing in high-speed photographing mode 3 illustrated in FIG. 22.

Figure 21:
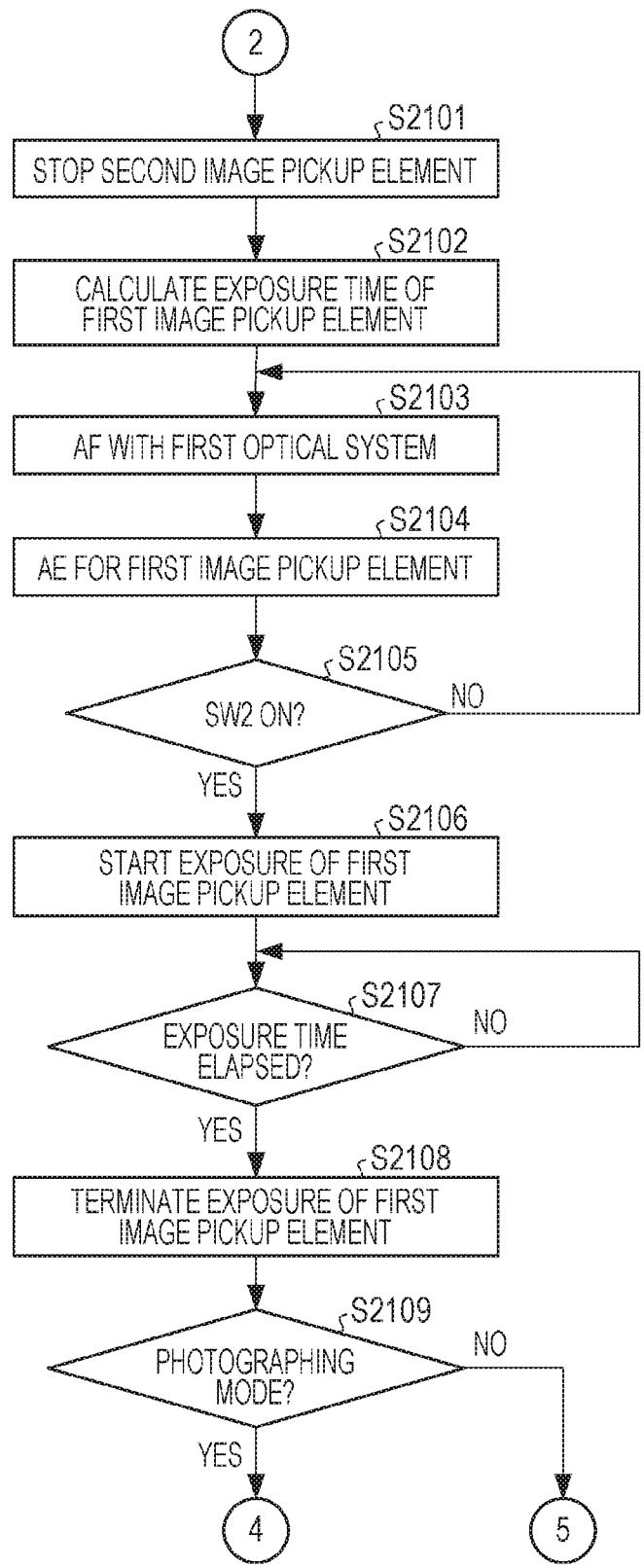
FIG. 21 is a flowchart illustrating image pickup processing in high-speed photographing mode 2 according to the fourth embodiment of the present invention.

FIG. 21 is a flowchart illustrating how the first control circuit 111 performs image pickup processing in high-speed photographing mode 2. In high-speed photographing mode 2, to capture an image with less blur, the exposure time of the first image pickup element 115 is calculated on the basis of the motion vectors calculated in step S1907, and an image is captured by the first image pickup element 115 in accordance with the exposure time.

In step S2101, the first control circuit 111 stops driving the second image pickup element 125 through the second control circuit 121.

In step S2102, the first control circuit 111 calculates the exposure time of the first image pickup element 115 on the basis of the amount of motion represented by a motion vector with high reliability calculated in step S1907. For example, assume that the second image pickup element 125 has a frame rate of 1000 fps, the amount of motion detected is equivalent to two pixels, and the diameter of permissible circle of confusion in the first image pickup element 115 is equivalent to four pixels. In this case, to keep the amount of motion within the diameter of permissible circle of confusion in the first image pickup element 115, the exposure time of the first image pickup element 115 is set to 1÷(2× 7200÷720÷4×1000)=1/5000 seconds. Thus, by setting the exposure time of the first image pickup element 115 from the amount of subject motion determined in advance, an image with less blur can be captured without an exposure end timing signal transmitted from the second image pickup system 120.

In step S2103, on the basis of the contrast level of the subject obtained from the first image pickup element 115 or the output of the focus detecting sensor (not shown), the first control circuit 111 drives the first optical system 114 to perform AF control.

In step S2104, on the basis of the luminance value of the subject obtained from the first image pickup element 115, the first control circuit 111 performs AE control for the first image pickup element 115.

In step S2105, the first control circuit 111 determines whether SW2 in the shutter switch included in the operation member 130 has been turned on by pressing the shutter switch all the way down. Steps S2103 and S2104 are repeated until SW2 is determined to be "on". Although the exposure time is calculated in step S2102 before determination of whether SW2 is on in the present embodiment, the calculation of the exposure time may be carried out immediately after determination that SW2 is on.

If determining in step S2105 that SW2 is on, the first control circuit 111 starts the exposure of the first image pickup element 115 in step S2106.

In step S2107, the first control circuit 111 waits until the exposure time of the first image pickup element 115 reaches the value set in step S2102, and if the exposure time reaches the set value, the process proceeds to step S2108.

In step S2108, the first control circuit 111 terminates the exposure of the first image pickup element 115.

In step S2109, the first control circuit 111 determines whether the photographing mode remains selected. If the photographing mode remains selected, the process returns to step S306, whereas if another mode is selected, the process returns to step S302.

Figure 22:
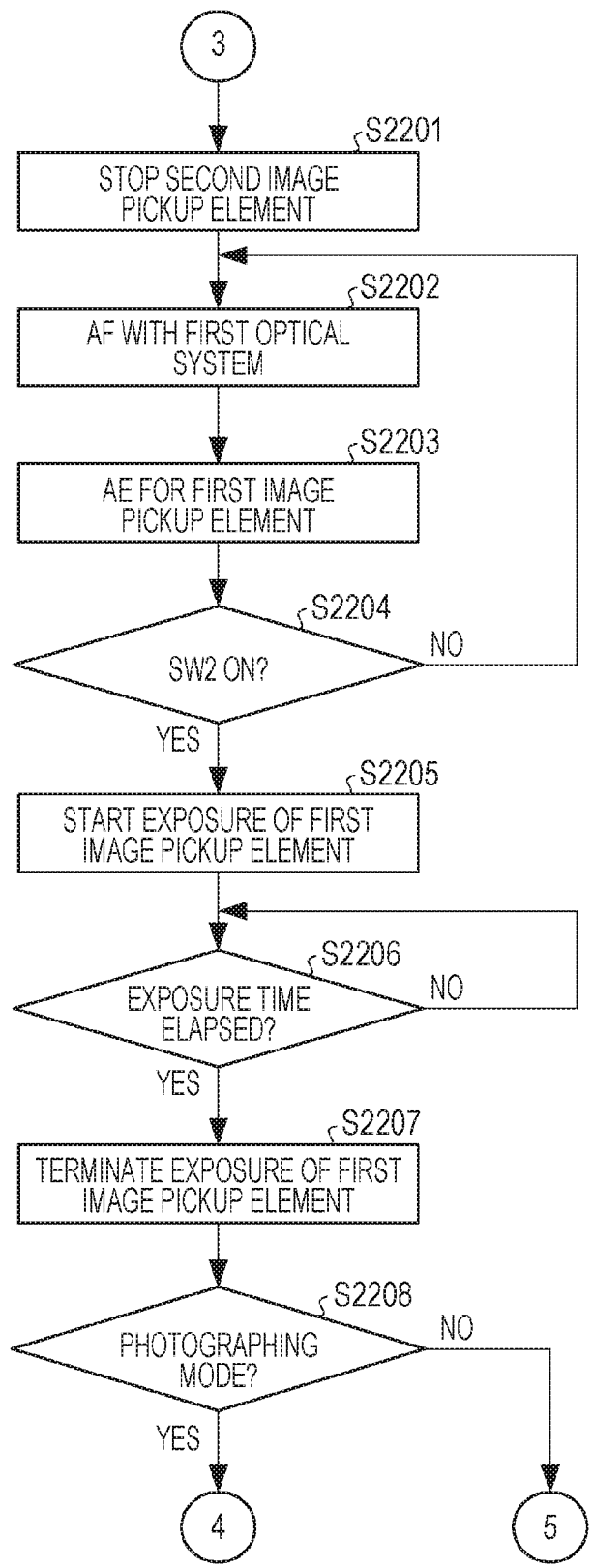
FIG. 22 is a flowchart illustrating image pickup processing in high-speed photographing mode 3 according to the fourth embodiment of the present invention.

FIG. 22 is a flowchart illustrating how the first control circuit 111 performs image pickup processing in high-speed photographing mode 3. High-speed photographing mode 3 does not allow high-accuracy detection of motion vectors from the second image pickup element 125. Therefore, as in typical image pickup processing, an image is captured by the first image pickup element 115 in accordance with the exposure time determined on the basis of the result of AE control.

In step S2201, the first control circuit 111 stops driving the second image pickup element 125 through the second control circuit 121.

In step S2202, on the basis of the contrast level of the subject obtained from the first image pickup element 115 or the output of the focus detecting sensor (not shown), the first control circuit 111 drives the first optical system 114 to perform AF control.

In step S2203, on the basis of the luminance value of the subject obtained from the first image pickup element 115, the first control circuit 111 performs AE control for the first image pickup element 115.

In step S2204, the first control circuit 111 determines whether SW2 in the shutter switch included in the operation member 130 has been turned on by pressing the shutter switch all the way down. Steps S2202 and S2203 are repeated until SW2 is determined to be "on".

If determining in step S2204 that SW2 is on, the first control circuit 111 starts the exposure of the first image pickup element 115 in step S2205.

In step S2206, the first control circuit 111 waits until the exposure time of the first image pickup element 115 reaches the exposure time determined from the result of AE control in step S2203, and if the exposure time determined is reached, the process proceeds to step S2207. Since a high-speed photographing mode is selected here, it is preferable that the exposure time be determined using a program diagram, where a higher priority is given to shorter exposure time (faster shutter speed) than to the ISO speed or aperture.

In step S2207, the first control circuit 111 terminates the exposure of the first image pickup element 115.

In step S2208, the first control circuit 111 determines whether the photographing mode remains selected. If the photographing mode remains selected, the process returns to step S306, whereas if another mode is selected, the process returns to step S302.

As described above, in the present embodiment, if image data with less blur can be obtained by terminating the exposure of the first image pickup element 115 in accordance with an exposure end timing signal transmitted from the second image pickup system 120, image pickup processing is performed in high-speed photographing mode 1. On the other hand, if the subject moves fast and image data with less blur cannot be obtained even by using the second image pickup system 120, the first control circuit 111 terminates the exposure of the first image pickup element 115 after the elapse of the exposure time determined in advance. In this case, if the speed of subject motion can be identified using the second image pickup system 120, image pickup processing is performed in high-speed photographing mode 2, where the exposure time of the first image pickup element 115 is determined on the basis of this speed. If it is determined that the motion of the subject cannot be accurately detected from image data obtained in the second image pickup element 125, image pickup processing is performed in high-speed photographing mode 3, where the exposure time is determined on the basis of AE processing using the first image pickup element 115. With this configuration, even when the exposure of the first image pickup element 115 cannot be effectively terminated in accordance with an exposure end timing signal transmitted from the second image pickup system 120, image data with less blur can be obtained. An alternative configuration may be used, where high-speed photographing mode 1 initially selected is switched to high-speed photographing mode 2 or 3 if the subject moves fast or it is determined that the motion of the subject cannot be accurately detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus comprising:
   first image pickup device;
   second image pickup device; and
   at least one processor or circuit configured to perform the operations of following units:
   calculating unit configured to calculate, using image data of a plurality of frames captured by the second image pickup device during exposure of the first image pickup device for image data of a first frame, the amount of subject motion in the image data of the plurality of frames;
   control unit configured to control the exposure of the first image pickup device for the image data of the first frame, on the basis of the amount of subject motion calculated by the calculating unit; and
   setting unit configured to set at least an imaging magnification of an optical system included in the second image pickup device or a sampling pitch of a signal in the second image pickup device, in accordance with a resolution of image data generated by the first image pickup device, a resolution of image data generated by the second image pickup device, and a permissible blur value in the first image pickup device.

2. The image pickup apparatus according to claim 1, wherein the control unit terminates the exposure of the first image pickup device for the image data of the first frame, on the basis of the amount of subject motion calculated by the calculating unit.

3. The image pickup apparatus according to claim 2, wherein the calculating unit includes cumulative amount calculating unit configured to calculate the cumulative amount of subject motion between frames of a plurality of pieces of image data; and
   the control unit terminates the exposure of the first image pickup device for the image data of the first frame, in accordance with a result of comparison between the cumulative amount and a first threshold.

4. The image pickup apparatus according to claim 3, wherein when image data of another frame is captured by the second image pickup device, the cumulative amount calculating unit newly calculates the cumulative amount of subject motion between frames of a plurality of pieces of image data captured so far; and
   if the cumulative amount is greater than or equal to the first threshold, the control unit terminates the exposure of the first image pickup device for the image data of the first frame.

5. The image pickup apparatus according to claim 4 wherein even when the cumulative amount is less than the first threshold, if a cumulative amount predicted for a next frame to be captured by the second image pickup device is greater than or equal to a second threshold greater than the first threshold, the control unit terminates the exposure of the first image pickup device for the image data of the first frame.

6. The image pickup apparatus according to claim 3, wherein the calculating unit calculates a motion vector as the amount of subject motion.

7. The image pickup apparatus according to claim 6, wherein the cumulative amount calculating unit tracks a plurality of motion vectors calculated in the plurality of pieces of image data, and calculates the cumulative amount on the basis of a sum of lengths of the tracked motion vectors.

8. The image pickup apparatus according to claim 2, wherein the calculating unit calculates, using image data of a plurality of frames captured by the second image pickup device before the exposure of the first image pickup device for the image data of the first frame, the amount of subject motion in the image data of the plurality of frames; and
if the amount of subject motion calculated by the calculating unit is greater than or equal to a third threshold, the control unit terminates the exposure for the image data of the first frame in accordance with an exposure time calculated in advance.

9. The image pickup apparatus according to claim 8, wherein if the amount of subject motion calculated by the calculating unit is greater than or equal to the third threshold, the control unit calculates the exposure time on the basis of the amount of subject motion.

10. The image pickup apparatus according to claim 1, wherein the setting unit sets at least the imaging magnification of the optical system included in the second image pickup device or the sampling pitch of the signal in the second image pickup device such that the resolution of image data generated by the second image pickup device is lower than or equal to the permissible blur value in the first image pickup device.

11. The image pickup apparatus according to claim 10, wherein the setting unit changes a focal length of the optical system included in the second image pickup device in accordance with the permissible blur value in the first image pickup device.

12. The image pickup apparatus according to claim 11, wherein if the resolution of the image data generated by the second image pickup device is lower than the permissible blur value in the first image pickup device, the setting unit shifts the focal length of the optical system included in the second image pickup device toward a telephoto end.

13. The image pickup apparatus according to claim 11, wherein the second image pickup device changes a read position of an image pickup element in the second image pickup device, in accordance with a focal length of an optical system included in the first image pickup device and the focal length of the optical system included in the second image pickup device.

14. The image pickup apparatus according to claim 11, wherein the second image pickup device changes a positional relation between an optical axis of the optical system and an image pickup element in the second image pickup device, in accordance with a focal length of an optical system included in the first image pickup device and the focal length of the optical system included in the second image pickup device.

15. An image pickup apparatus removable from an external image pickup apparatus including first image pickup device, the image pickup apparatus comprising:
second image pickup device; and
at least one processor or circuit configured to perform the operations of following units:
calculating unit configured to calculate, using image data of a plurality of frames captured by the second image pickup device during exposure of the first image pickup device for image data of a first frame, the amount of subject motion in the image data of the plurality of frames;
control unit configured to output a signal for controlling the exposure of the first image pickup device for the image data of the first frame, on the basis of the amount of subject motion calculated by the calculating unit; and
setting unit configured to set at least an imaging magnification of an optical system included in the second image pickup device or a sampling pitch of a signal in the second image pickup device, in accordance with a resolution of image data generated by the first image pickup device, a resolution of image data generated by the second image pickup device, and a permissible blur value in the first image pickup device.

16. The image pickup apparatus according to claim 15, wherein the control unit terminates the exposure of the first image pickup device for the image data of the first frame, on the basis of the amount of subject motion calculated by the calculating unit.

17. The image pickup apparatus according to claim 16, wherein the calculating unit includes a cumulative amount calculating unit for calculating the cumulative amount of subject motion between frames of a plurality of pieces of image data; and
the control unit outputs the signal for terminating the exposure of the first image pickup device for the image data of the first frame, in accordance with a result of comparison between the cumulative amount and a first threshold.

18. The image pickup apparatus according to claim 15, wherein a product of the imaging magnification of the optical system included in the second image pickup device and the sampling pitch is smaller than a minimum product of an imaging magnification of an optical system included in the first image pickup device and a sampling pitch.

19. A control method of an image pickup apparatus, the method comprising:
setting at least an imaging magnification of an optical system included in a second image pickup device or a sampling pitch of a signal in the second image pickup device, in accordance with a resolution of image data generated by first image pickup device, a resolution of image data generated by the second image pickup device, and a permissible blur value in the first image pickup device;
calculating, using image data of a plurality of frames captured by the second image pickup device during exposure of the first image pickup device for image data of a first frame, the amount of subject motion in the image data of the plurality of frames; and
outputting a signal for controlling the exposure of the first image pickup device for the image data of the first frame, on the basis of the amount of subject motion.

20. A non-transitory computer-readable storage medium storing a program executed by a computer included in an image pickup apparatus, the program causing the computer of the image pickup apparatus to execute the steps of:
setting at least an imaging magnification of an optical system included in a second image pickup device or a sampling pitch of a signal in the second image pickup device, in accordance with a resolution of image data generated by a first image pickup device, a resolution of image data generated by the second image pickup device, and a permissible blur value in the first image pickup device;

calculating, using image data of a plurality of frames captured by the second image pickup device during exposure of the first image pickup device for image data of a first frame, the amount of subject motion in the image data of the plurality of frames; and outputting a signal for controlling the exposure of the first image pickup device for the image data of the first frame, on the basis of the amount of subject motion.

* * * * *